United States Patent
Morfino

(10) Patent No.: US 7,245,982 B2
(45) Date of Patent: Jul. 17, 2007

(54) SYSTEM AND PROCESS FOR MEASURING, COMPENSATING AND TESTING NUMERICALLY CONTROLLED MACHINE TOOL HEADS AND/OR TABLES

(75) Inventor: Giuseppe Morfino, I-Pino Torinese (IT)

(73) Assignee: FIDIA S.p.A., San Mauro Torinese (IT)

( * ) Notice: Subject to any disclaimer, the term of this patent is extended or adjusted under 35 U.S.C. 154(b) by 239 days.

(21) Appl. No.: 10/525,927

(22) PCT Filed: Sep. 19, 2003

(86) PCT No.: PCT/IT03/00556

§ 371 (c)(1),
(2), (4) Date: Feb. 24, 2005

(87) PCT Pub. No.: WO2004/033147

PCT Pub. Date: Apr. 22, 2004

(65) Prior Publication Data

US 2005/0234671 A1    Oct. 20, 2005

(30) Foreign Application Priority Data

Oct. 11, 2002   (WO) ................ PCT/IT02/00651

(51) Int. Cl.
*G06F 19/00* (2006.01)
(52) U.S. Cl. .............. 700/174; 700/159; 702/95; 702/97; 318/632
(58) Field of Classification Search ........ 700/159, 700/161, 163, 173, 174, 176; 702/94, 95, 702/97; 318/568.22, 569, 570, 577
See application file for complete search history.

(56) References Cited

U.S. PATENT DOCUMENTS 4,879,817 A    11/1989  McMurtry (Continued)

FOREIGN PATENT DOCUMENTS

WO    WO 97/43703    11/1997

(Continued)

OTHER PUBLICATIONS

Duffie et al., "Generation of Parametric Kinematic Error-Compensation Functions for Volumetric Error Measurements," Annals of the CIRP, vol. 34/1/1985, pp. 435-438.

(Continued)

*Primary Examiner*—Leo Picard
*Assistant Examiner*—Charles Kasenge
(74) *Attorney, Agent, or Firm*—David A. Farah; Sheldon Mak Rose & Anderson PC

(57) ABSTRACT

A system and a process are disclosed, that are automated and integrated with numerically controlled systems, for measuring, compensating and testing numerically controlled machine tool heads (1) and/or tables. The system comprises: at least one support base (11) equipped with a plurality of distance sensors (14); at least one device (16) of the gage tool type composed of an elongated cylinder (17) that is equipped at one of its ends with connection means (18) for the heads (1) and is equipped at another opposite end with a ball (20), wherein the ball (20) is placed next to the sensors (14) so that they are able, always and in any position, to measure the distance that separates them from the ball (20) and determine thereby the position in the Cartesian space.

43 Claims, 14 Drawing Sheets

U.S. PATENT DOCUMENTS

| | | | |
|---|---|---|---|
| 5,214,857 A | | 6/1993 | McMurtry et al. |
| 5,247,233 A | * | 9/1993 | Matsuura et al. ........... 700/161 |
| 5,266,811 A | * | 11/1993 | Matsuura .................... 356/606 |
| 5,327,351 A | * | 7/1994 | Matsuura et al. ........... 700/163 |
| 5,341,079 A | * | 8/1994 | Matsuura et al. ........... 318/632 |
| 5,841,668 A | | 11/1998 | Pahk et al. |
| 6,167,634 B1 | * | 1/2001 | Pahk et al. ................... 33/702 |
| 2001/0025427 A1 | | 10/2001 | Held et al. |

FOREIGN PATENT DOCUMENTS

| | | | |
|---|---|---|---|
| WO | WO 00/14474 A | | 3/2000 |

OTHER PUBLICATIONS

Hush et al., "An Overview of Neural Networks, Part I: Static Networks; Part II: Dynamic Networks," Informatica y Automatica, vol. 25-1, 1992, pp. 18-36.

Kim et al., "Volumetric Accuracy Based on Generalized Geometric Error Model in Multi-Axis Machine Tool," Mec. Mach. Theory, vol. 26 (1991) No. 2, pp. 207-219.

Moriwaki et al., "NN Approach to Identify Thermal Deformation of Machining Center," Human Aspects in Computed Integrated Manufacturing, Elsevier, 1992, pp. 685-697.

O'Brien et al., "Can Neural Nets Work in Condition Monitoring," Coventry Polytechnic, Coventry, England, Comadem 92, 1992, pp. 88-93.

* cited by examiner

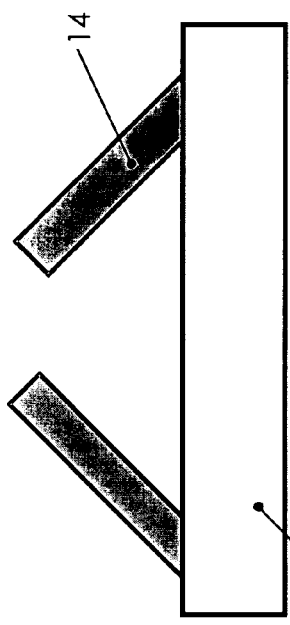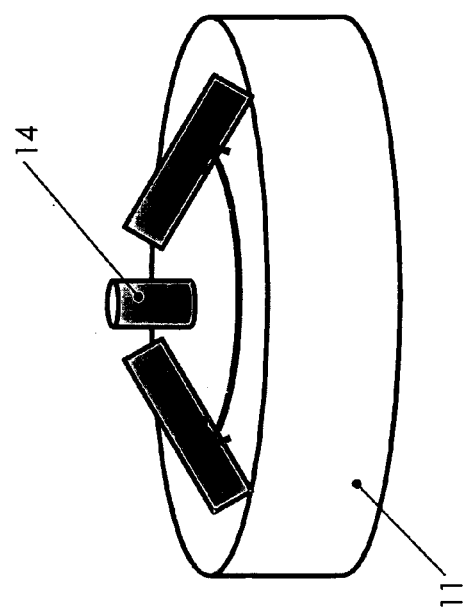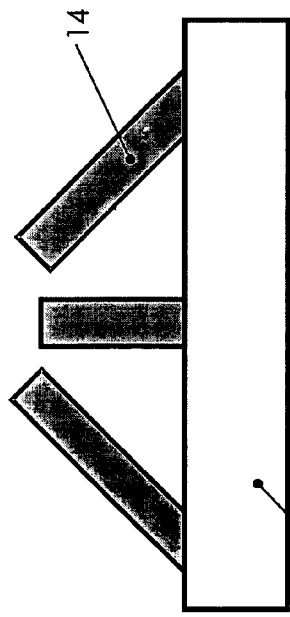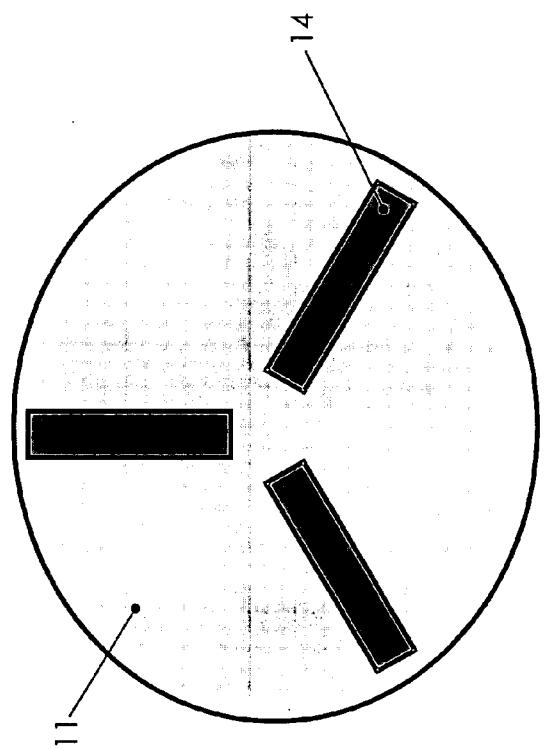

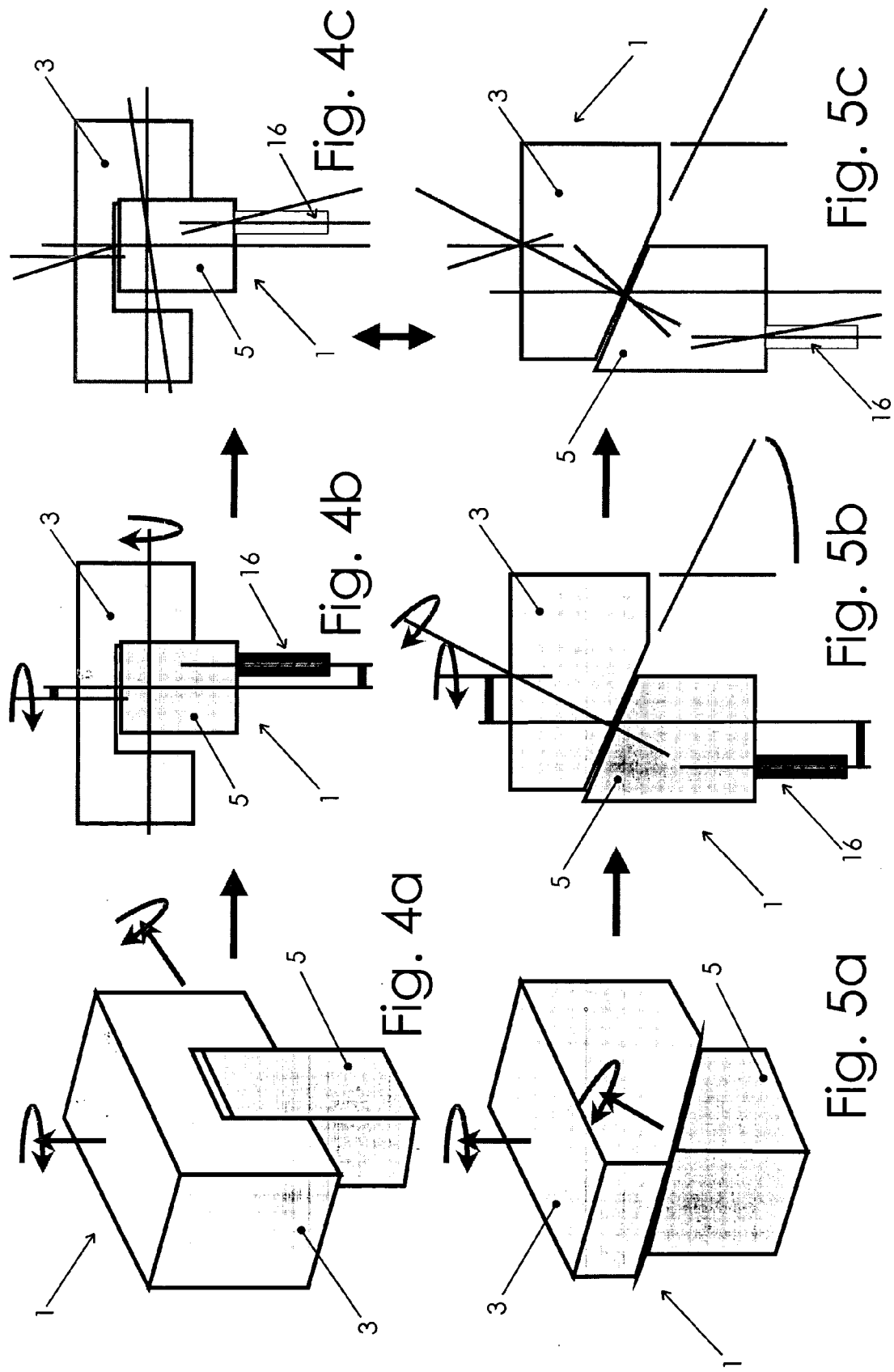

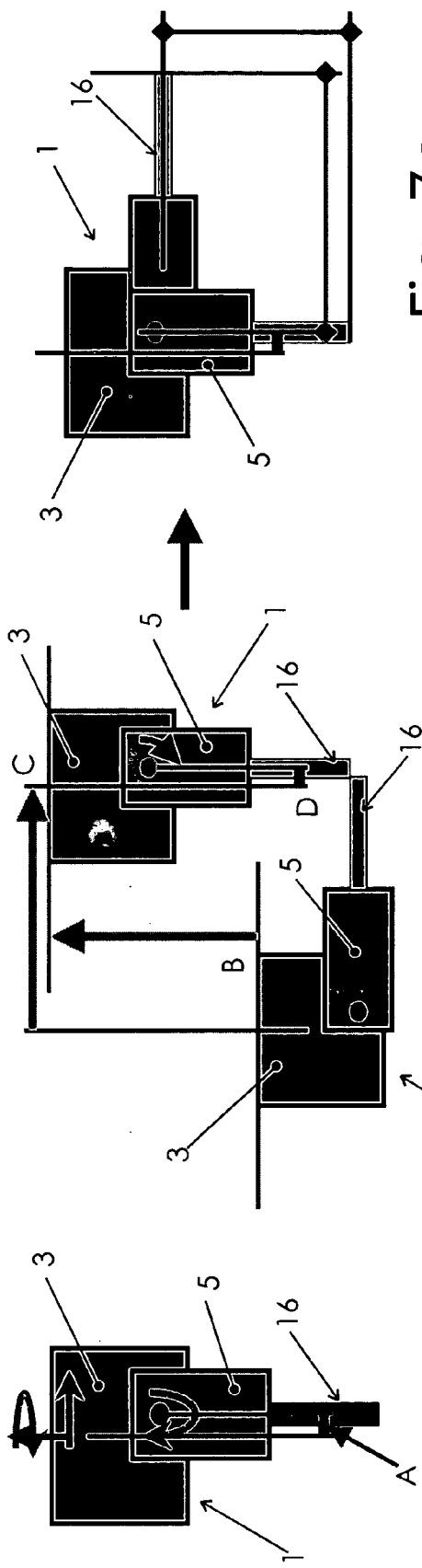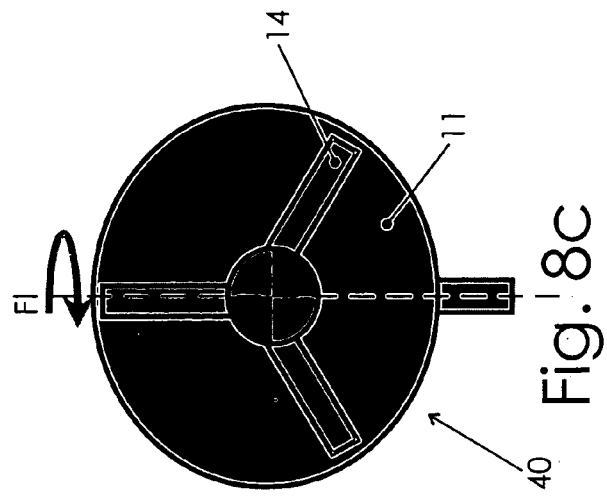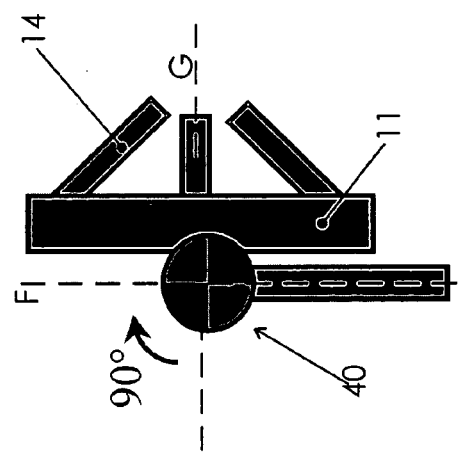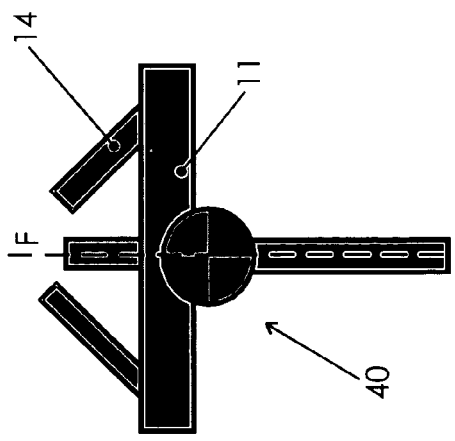

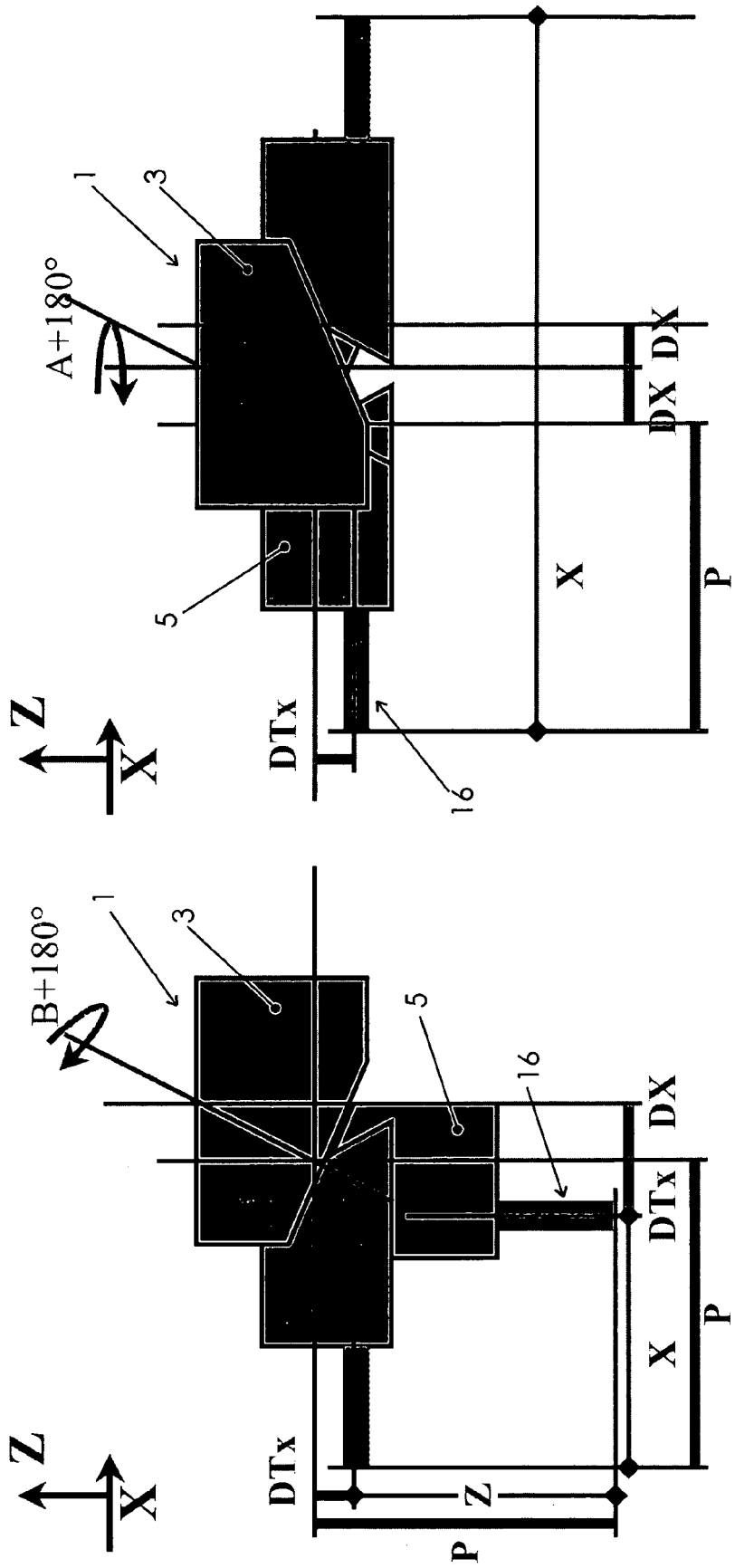

SYSTEM AND PROCESS FOR MEASURING, COMPENSATING AND TESTING NUMERICALLY CONTROLLED MACHINE TOOL HEADS AND/OR TABLES

CROSS-REFERENCE TO RELATED APPLICATION

The present application is a United States National Phase Application of International Application PCT/IT2003/000556, titled "System and Process for Measuring, Compensating and Testing Numerically Controlled Machine Tool Heads and/or Tables," filed Sep. 19, 2003, which claims priority from International Application PCT/IT02/00651, titled "System and Process for Measuring, Compensating and Testing Numerically Controlled Machine Tool Heads and/or Tables," filed Oct. 11, 2002, the contents of which are incorporated herein in their entirety.

The present invention relates to processes for measuring, compensating and testing rotary heads and/or tables for numerically controlled machine tools and to a hardware and software system that performs such processes.

The invention will be described and shown herein below as applied to machine heads, but obviously everything that is described can be similarly applied to systems with head+table or only machine tool tables obtaining the same inventive effects and advantages, since simple Cartesian reference systems conversions are hereby involved.

The rotary heads (herein below called "heads") of numerically controlled machine tools are machine tools axes controlled through a numeric control (CNC). These heads are commonly equipped with one or two rotation degrees of freedom. Possible variations to such configuration, that has to be deemed included within the scope of the present invention, are rotary heads in which the rotation movements are partially or wholly decomposed on rotating tables.

The hardware system, that will be described herein below, allows measuring with automatic processes enough values so that measuring processes and software can process compensations and tests of this part of the machine.

The term "geometric measure" of the heads means the measure of geometric head errors. These errors are generated by an incorrect component assembling, by an incorrect realization of the components or by the component weights. Herein below a more detailed classification of these error types will also be explained.

The term "compensation" of the heads means the software correction of the measured errors within the numeric control. As previously mentioned, an error classification will be given below and therefrom the related software compensation algorithms will follow. The compensation further includes both a measuring software and a compensation software. The measuring software allows performing and processing the measuring data while the compensation software performs corrections of measured and processed errors.

The term "automatic processes" of the heads means a series of automatic machine movements that, through the hardware system, collect measures that the measuring software processes to create compensation software input data.

The term "dynamic test" of the heads means the measure of dynamic responses of machine movements that involve rotation head axes. Typically, these tests point out "twitching" and "ripple" problems for these axes.

Currently, there are no dynamic test systems for the heads, while there are manual or semi-automatic geometric measuring processes: these latter ones, above all for the purposes of the present invention, are not systems that are integrated in the numeric control and they do not allow the freedom to suit at will the complexity of the error model that has to be described by performing the measures.

The current geometric measures provide for the use of measuring systems, such as decimal or millesimal comparators, and artefacts, such as certified squares, control cylinders (commonly called "gage tools"), etc. The measure operator, with a series of known manual operations, after having assembled and repeatedly positioned the above mentioned artefacts, takes note of the measure values. The semi-automatic processes mainly use digital feeler devices (see, for example, the Renishaw system MP10) and a reference artefact (mainly a ball). With measuring processes it is thereby possible to obtain part of the values that can be measured with the manual system. The major problem with these known techniques is that they make the integration with the numeric control difficult and make the use of complex compensation models unfeasible, since the number of measures to be performed and the timing generated by such technique would be excessively long and cumbersome.

One of the limits of such applications is that not all the necessary measures and/or variables for the geometric head measure can be automatically measured, as can be well seen from the schematic drawings in FIG. 1. In such Figure, it can be seen that the parallelism check between the axis of head 1 equipped with two parts 3 and 5 and a stem 7 in a mutual rotation movement, and the reference Cartesian axes is carried out through a measuring instrument (commonly called "gage tool") 9 placed next to the stem 7. The limits of such type of operation essentially are the adopted measuring systems and the following limited measuring processes.

The object of the present invention is solving the prior art deficiencies, by providing a system and a process for measuring, compensating and testing numerically controlled machine tool heads that allow obtaining the following innovations:

a) an instrument, and therefore processes, for automatically performing the geometric measures integrating such system into the numeric control;

b) the chance of increasing the complexity of such measures in order to describe more complex head errors, always having, however, measure execution times that are extremely reduced with respect to the prior art;

c) the use of such instrument for dynamic tests;

d) the use of known correction systems to perform the compensation of measured errors.

The above and other objects and advantages of the invention, as will appear from the following description, are reached by systems and processes as disclosed in the independent Claims. Preferred embodiments and non-trivial variations of the present invention are disclosed in the dependent Claims.

The present invention will be better described by some preferred embodiments, provided as a non-limiting example, with reference to the enclosed drawings, in which:

FIGS. 2A to 2D are views of the support base 11 part of an embodiment of the system of the present invention;

FIGS. 4A to 4C are schematic views of an embodiment of the head of the system of the invention with related geometric models;

FIGS. 5A to 5C are schematic views of another embodiment of the head of the system of the invention with related geometric models;

FIGS. 7A to 7C are schematic views that exemplify the way in which the measured amounts are shown;

FIGS. 8A to 8C are schematic views that show the movements of the support base 11 of FIG. 2A to 2D;

FIGS. 17 to 21 are schematic views of the movements of the system of the present invention.

Figure 1:
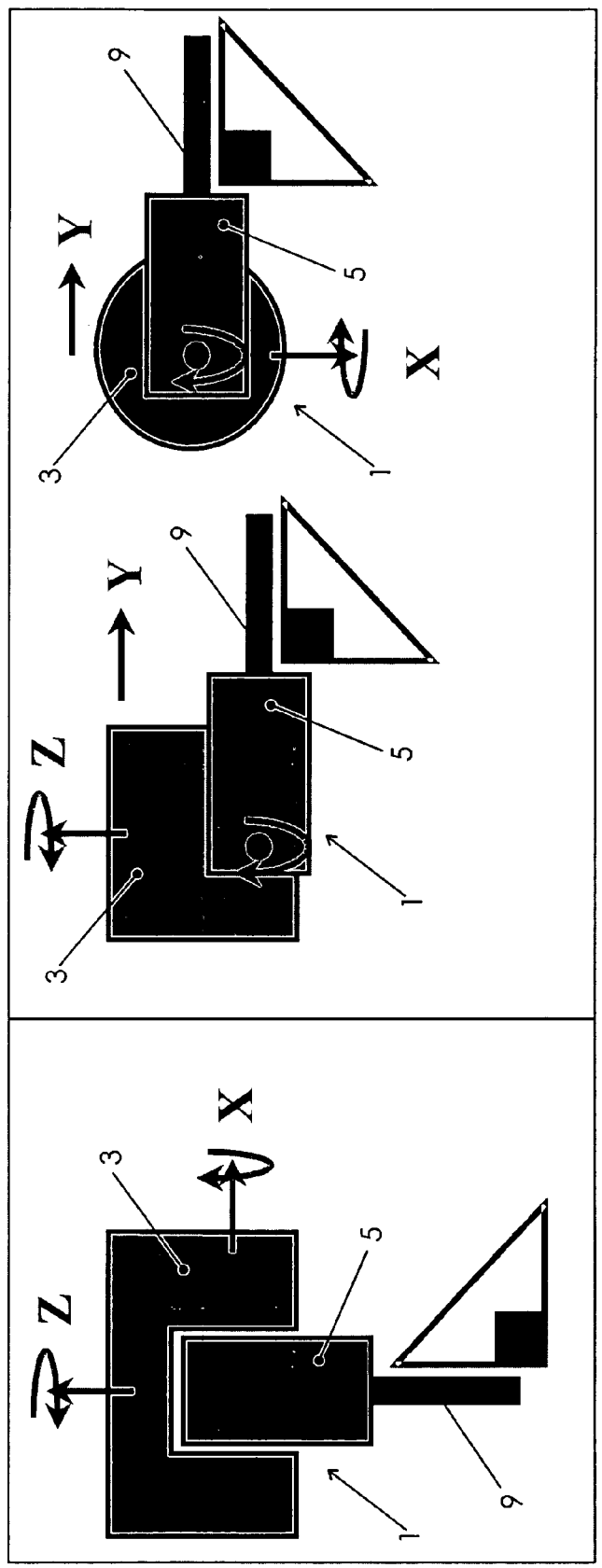
FIG. 1 is a schematic view that shows the measuring steps of axis quadrature in the prior art.

With reference to the Figures, a preferred, but non-limiting embodiment of the system of the present invention is shown. The system will be described herein below as applied to the field of measuring, compensating and testing numerically controlled machine tool heads 1, but it is obvious that it can find a valid and efficient application to any field in which a completely automated, accurate and reliable measure of object positions in reference systems is necessary. With reference to the Figures, and in particular to FIG. 2 to 5, the system for measuring, compensating and testing numerically controlled machine tool heads 1 and/or tables substantially comprises:

at least one support base 11 equipped with a plurality of distance sensors 14;

at least one device 16 of the gage tool type composed of an elongated cylinder 17; the cylinder 17 is equipped at one of its ends with connection means 18 for the heads 1 and is equipped at another opposite end with a ball 20, that is placed next to the sensors 14 so that they are able, always and in any position, to measure the distance that separates them from the ball 20.

In particular, the support base 11 can be of a circular shape and is preferably equipped with three distance sensors 14 placed on the base in positions that are mutually offset by 120°. Instead, the connection means 18 are of the tapered type and the heads 1 are adapted to receive, in one of their moving parts 3, 5, the connection means 18 for the unmovable connection thereto during the measures.

Figure 6:
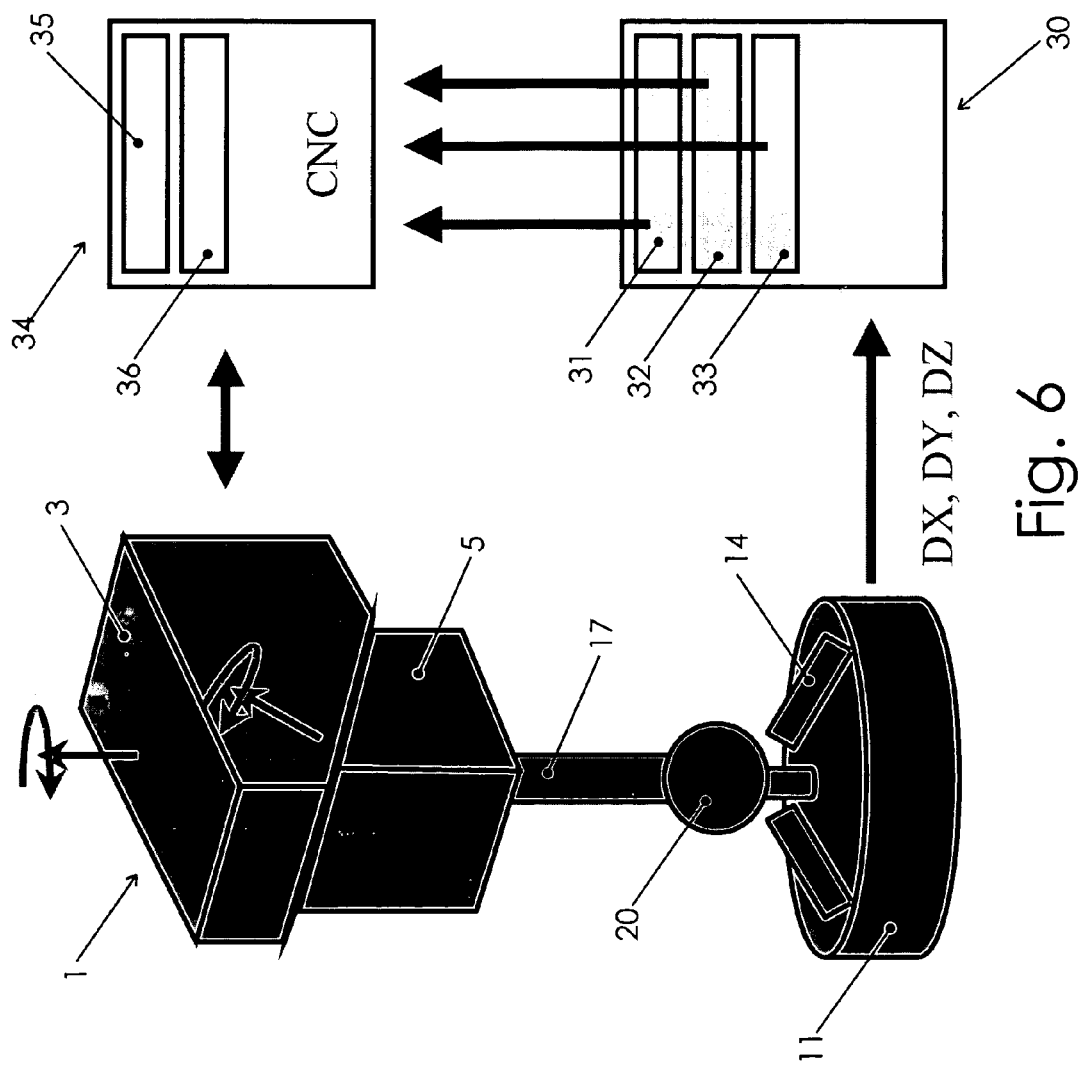
FIG. 6 is a schematic view of an embodiment of the system of the invention.
Figure 3:
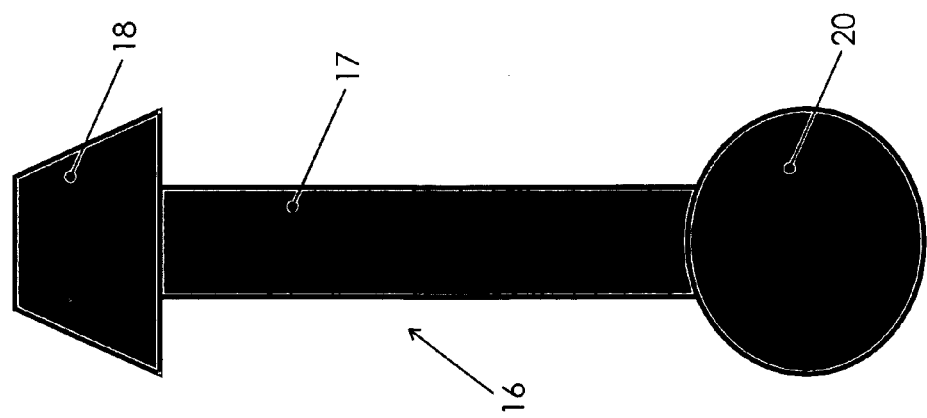
FIG. 3 is a side view of the gage tool part of an embodiment of the system of the present invention.

According to what is shown in FIG. 6, the system of the invention is operatively coupled to processing means 30 comprising means 31 for performing processes for measuring errors that can be modeled, means 32 for performing processes for measuring errors that cannot be modeled and means 33 for performing dynamic checks. Moreover, the heads 1 are operatively coupled with test and control means 34 also comprising means 35 for performing compensation processes of errors that can be modeled and means 36 for performing compensation processes of errors that cannot be modeled.

According to the measure of positioning errors of the ball 20 of the gage tool 16, that ideally shows the tool tip, two possible processes can be obtained:

1) The head 1 is moved by using already active compensations (those of errors that can be modeled). Then the CNC deems to have kept the ball 20 centre unmoved (in CNC systems this type of movement is commonly called movement with enabled RTCP). The error measure can be carried out using one of the following alternatives:

a) The values provided by the sensors 14 of the support base 11 can be transformed into real coordinates of the ball 20 of the gage tool 16. The difference between theoretical coordinates and real coordinates of the ball 20 shows the measured errors.

b) The values provided by the sensors 14 of the support base 11 can be used to correct the position of the machine linear axis in order to take back the ball 20 to the point where the sensors 14 provide the initial values. In this way the ball 20 will not have been moved but otherwise the linear axis will have performed an additional movement with respect to the one that the CNC would have imposed to them depending on currently active compensations. Such corrections are the measured errors.

2) The head is handled without using any active compensation in the CNC. Through the previously-listed process b, the linear axes position is corrected in order to take back the ball 20 to the point in which the sensors 14 provide the initial values. Such induced movements represent the indirect error measure for computation purposes.

As regards the error detection mechanism, through a software that can be easily and readily realized that performs some transforming, the support base 11 with the sensors 14 provides the position of the ball 20 of the gage tool 16. The process to detect the position of the ball 20 is known in the art and will not be described in further detail in this context. For measuring the errors, it is necessary to perform a calibration process of the sensors 14 of the support base 11 (such process is known in the art and will not be described herein in detail).

Independently from the technique used to extract the positioning errors from the controlled movements to the machine, as shown in FIG. 7A to 7B, the measuring system is idealized assuming that the machine displacement (desired displacement+measured errors) is able to be measured. In FIG. 7A, a displacement error A of the head 1 axis is shown, depending on which, as shown in FIG. 7B, a measured error D occurs following the programmed movement of the head 1 from a position B to a position C, such movement being represented by the corresponding arrows in the Figure. The situation in FIG. 7C thereby occurs, that shows the diagram of the performed measure.

As regards the error measuring process, the advantages of the configuration of the system with sensors 14 and support base 11 as a tripod are:

1) Enough measuring accuracy in order to determine the centre of the ball 20 of the gage tool 16 and therefore the errors to be measured. The sensors 14 can be realized using different technologies and can provide or not the contact with the ball 20 of the gage tool 16. When distance sensors 14 are used instead of the contact ones and of a capacitive type, the support base 11 can be shaped as a hollow spherical cover (not shown) whose focal point is the centre of the ball 20 of the gage tool 16. This is in order to minimize capacitive measures noises. Such modifications (and similar ones) must not be deemed as variations from the basic concept of the support base 11 as previously described.

2) Possibility of slanting the gage tool 16 below the horizontal line without collisions between moving bodies and measuring instrument. The wide range of positions that can be reached for the measures allows the measuring software to inspect thereby all interesting head positions.

According to what is shown in FIG. 8A to 8C, the support base 11 can be connected to bearing means 40 adapted to allow a rotation of the support base 11 itself up to 90° with respect to its own axis (F), in order to reach a plurality of operating positions between two mutually perpendicular extreme axes (F, G). The bearing means 40 are further adapted to simultaneously allow a rotation of the support base 11, once having reached the extreme axis (G) position, around the axis (F) perpendicular thereto.

As regards the geometric measure process of the head 1, as described previously, the automatic measures allowed by the measuring instrument and the measure processes, allow increasing the complexity degree of the geometric head model. In this context, the term "geometric model" of the head 1 means the mathematical model that describes the real behaviour of the head 1 with respect to the theoretical one. The parameters of such model are those that are obtained through the measures.

FIGS. 4A to 4C and 5A to 5C show some types of heads and the related simplified geometric models that are used today related to a possible more complex model that can be used with the system described here.

The parameters of these geometric models can be called errors that can be modeled, meaning that a possible compensation system is able to use these parameters to compute the errors that the CNC must correct for working purposes. These latter errors are, for example, positioning errors of the tool end (tool tip).

When the head 1 has been compensated by using the above described system, it will have a series of errors that the used model, though more complex, does not describe. These errors, that can be called errors that cannot be modeled, result into a still incorrect tool tip positioning. The instrument described here (but also equivalent instruments such as digital feeler pins and reference balls) is also able to perform the measure of these residual errors.

It will now be demonstrated that the described system is able to provide necessary data for identifying the parameters of a geometric model of a head 1 selected as an example. The demonstration is divided into three examples that describe geometric models with increasing complexity for measuring the errors that can be modeled and a further example that describes the measure of the errors that cannot be modeled.

For better clarifying, the examples of procedures will include:

Example 1) Procedure for measuring a head with a simple geometric model

Example 2) Procedure for measuring a head with a complex geometric model

Example 3) Procedure for measuring a head using an algorithm for solving complex models Example 4) Procedure for measuring errors that cannot be modeled Example 5) Description of a practical arrangement

EXAMPLE 1

Figure 9:
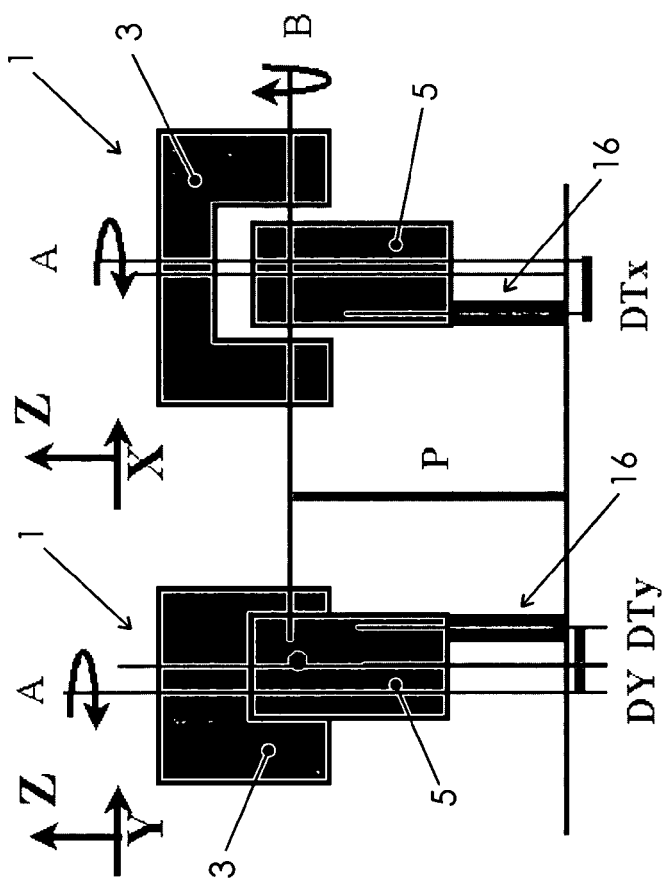
FIG. 9 is a schematic view that shows an application example of the system of the invention.

Let us take into account the geometric model described in FIG. 9 where it is assumed as an example that the axes runs are A [0;360] B [−90;90] (refer to FIG. 9):

The parameters of this model are:

Angular positioning accuracy for axes A and B.

Direction and rotation centre of axes A and B. The exact orientation of the rotation axis must be located in order to determine the parallelism position between rotation axis and linear axis.

Zero pre-set of axes A and B. The 0 pre-set shows the position in which an axis is programmed in position 0. For a head the 0 pre-set is the point in which the tool is aligned with axis Z.

P (commonly called pivot), DY (distance between rotation axis for axis B and axis A), DTy (distance in plane YZ between gage tool axis and rotation axis for axis A), DTx (distance in plane XZ between gage tool axis and rotation axis for axis A)

It must be noted that the figure in plane YZ assumes that the 0 pre-set for axis A has already been located. Otherwise the distance between the rotation axes would have, in addition to a component DY, also a component DX since the rotation axis of axis B would not be perpendicular to plane YZ. It is for such reason that before computing DY, the 0 pre-sets are computed.

For easy of exposition in the figure the rotation axes are shown parallel to the linear axis. In practice this is obtained after having measured and corrected the parallelism between rotation axes and linear axis.

The measuring procedure consists in the following steps:

Step 1:

Head positioning A=0 B=90°.

Movement of axis A from 0° to 360° and positioning errors acquisition for a defined pitch in axis A movement.

A series of points is then measured that describe a circle. The circle equation can be computed with known quadratic error minimizing methods.

From the measured points (which have an univocal relationship with axis A transduced position) it is possible to determine the angular positioning accuracy for axis A.

From the circle equation it is possible to determine the rotation axis slant for axis A with respect to axis Z (parallelism between rotation axis A and linear axis Z).

From the measured points it is then possible to determine which is the axis A transducer value for which the measured points lie in plane YZ. The 0 pre-set for axis A is thereby determined.

It must be noted that the errors in axis B (0 pre-set, parallelisms and transducer linearity) have no influence whatsoever.

Figure 15:
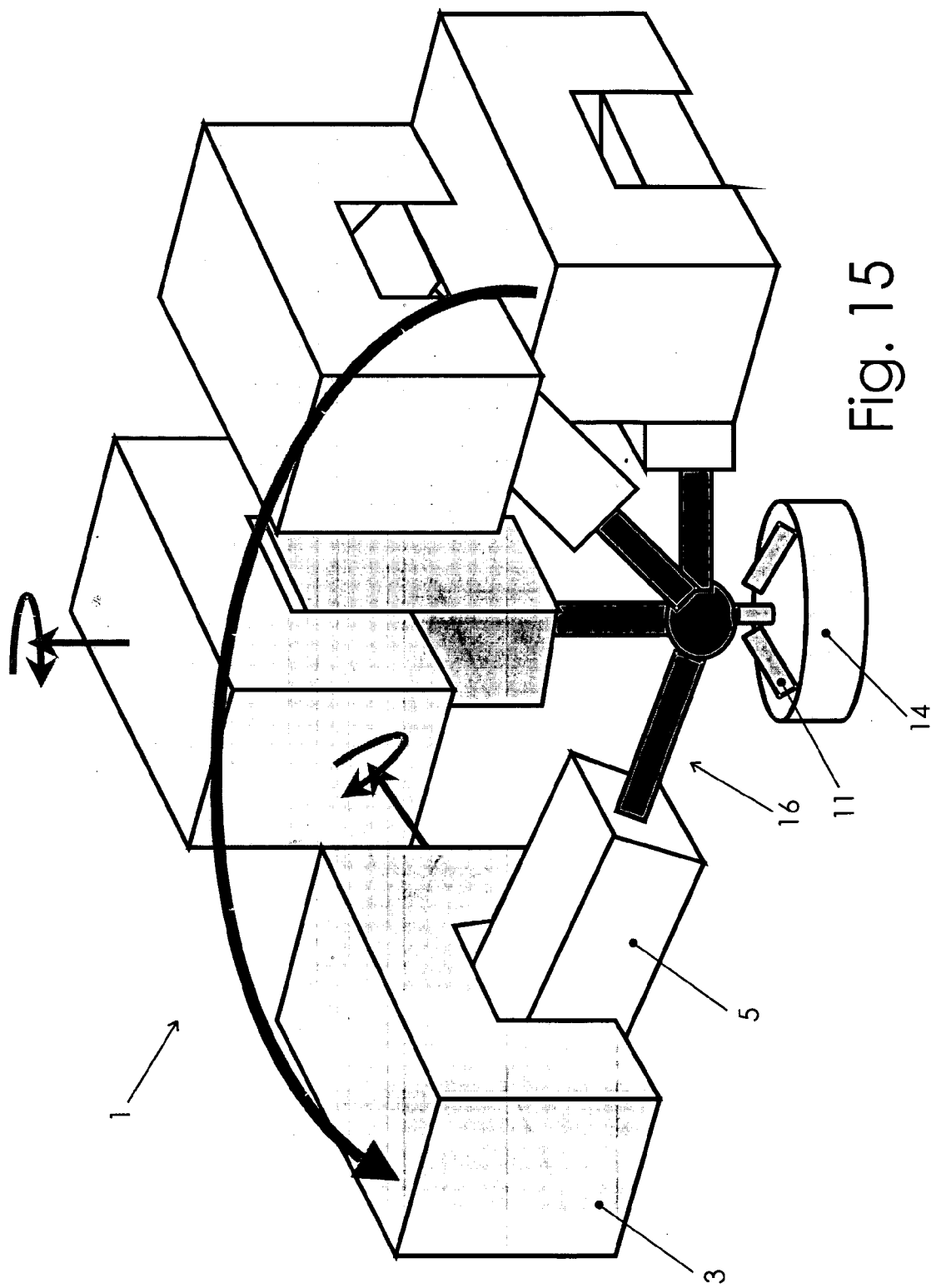
FIG. 15 is a perspective view that shows some operating positions of the system of the invention.

Step 2:

With a similar procedure to the one in step 1, the head is positioned A=0 B=90° and a movement of axis B is carried out from 90° to −90° and a positioning error acquisition is carried out for a defined pitch in axis B movement (see FIG. 15).

A series of points is then measured that describe a semicircle. The circle equation can be computed with the known quadratic error minimizing methods.

From the measured points (which have an univocal relationship with axis B transduced position) it is possible to determine the angular positioning accuracy for axis B.

From the circle equation it is possible to determine the rotation axis slant for axis B with respect to axis X (parallelism between rotation axis B and linear axis X).

From the measured points it is then possible to determine which is the axis B transducer value for which the measured points lie in plane XZ. The 0 pre-set for axis B is thereby determined.

At this time both for axis A and for axis B the following are known: angular positioning accuracy, parallelism between rotation axes and linear axis, zero pre-set. By activating such parameters in the compensation software or by taking into account their value in the measuring software, it can be assumed that their effects have been cancelled and thereby the head has been driven to the condition described in the starting figure.

Figure 10:
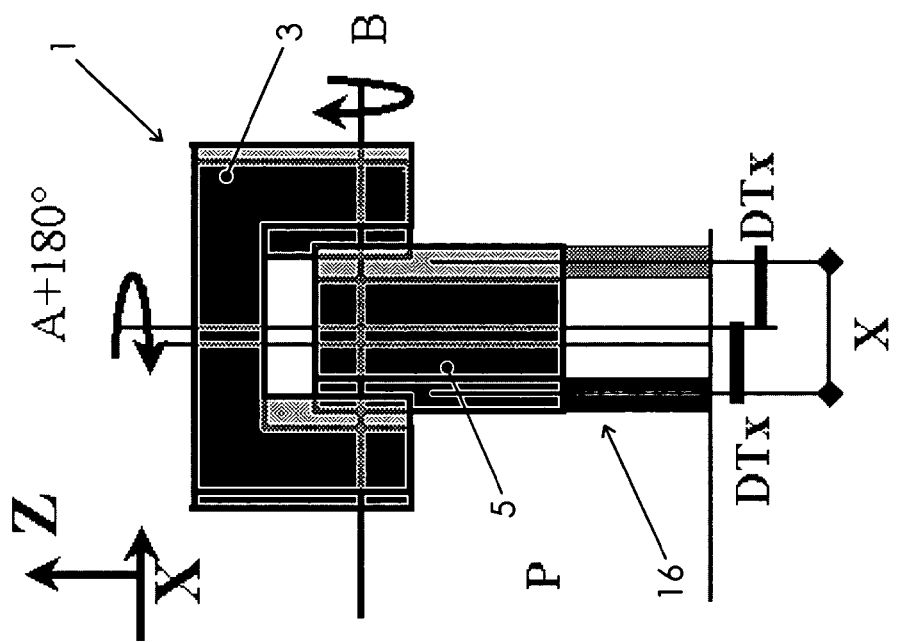
FIGS. 10 to 13 are schematic views of further steps in the example in FIG. 9.

Step 3:

Errors in positions A=0 B=0 and A=180 B=0 are measured (see FIG. 10).

The relationship: $2*DTx=X$ is obtained, where X is the index of a value that can be measured through the gage tool (see FIG. 3)+tripod (see FIG. 2) measuring system.

Figure 11:
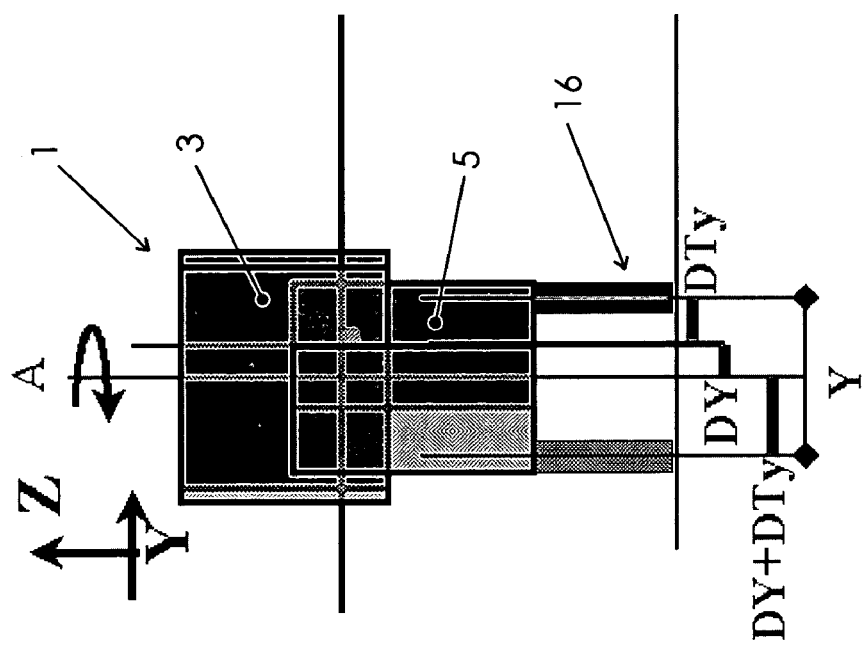

Step 4:

Errors in positions A=0 B=0 and A=180 B=0 are measured (see FIG. 11).

The relationship: $2*(DY+DTy)=Y$ is obtained, where Y is the index of a value that can be measured through the gage tool+tripod measuring system.

Figure 12:
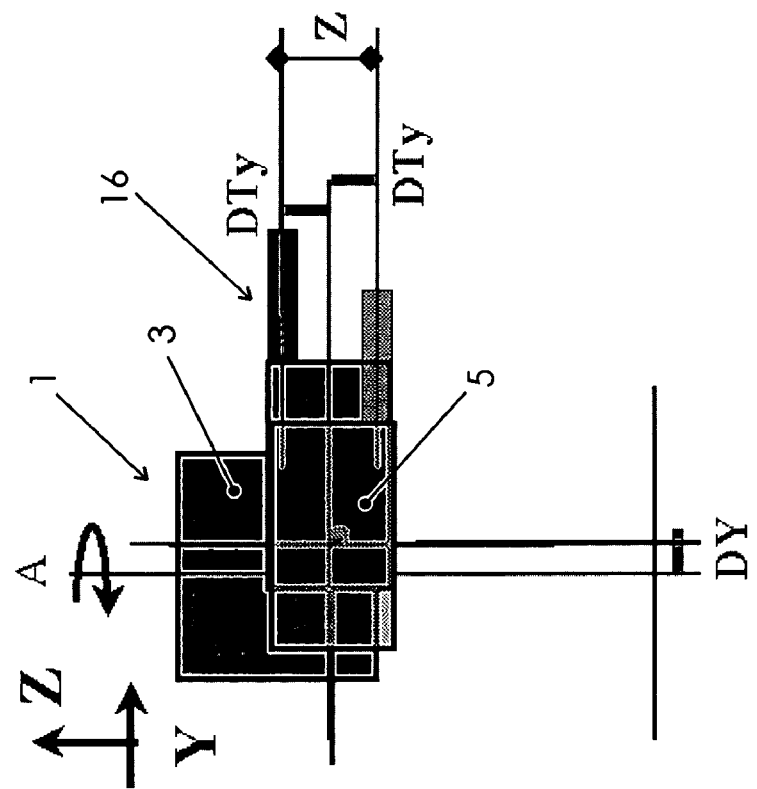

Step 5:

Errors in positions A=0 B=−90 and A=180 B=90 are measured (see FIG. 12).

The relationship: $2*DTy=Z$ is obtained, where Z is the index of a value that can be measured through the gage tool+tripod measuring system.

Figure 13:
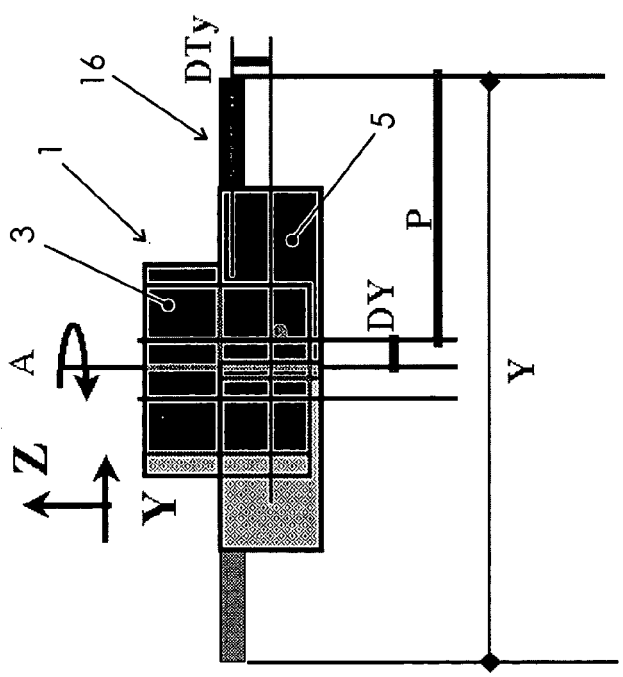

Step 6:

Errors in positions A=0 B=−90 and A=180 B=−90 are measured (see FIG. 13).

The relationship: $2*(DY+P)=Y$ is obtained, where Y is the index of a value that can be measured through the gage tool+tripod measuring system.

The equations found in steps 3 to 6 are all independent and their resolution is mathematically able to be demonstrated.

With a similar procedure a nutator head can be measured.

Figure 16:
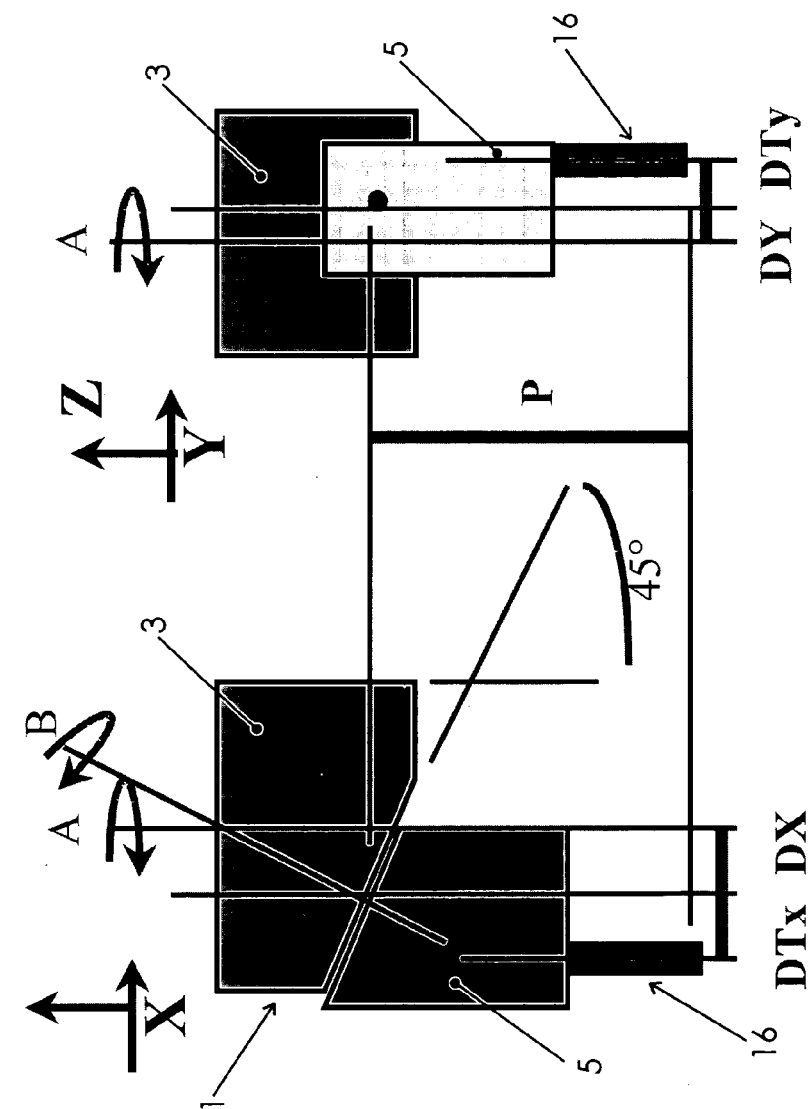
FIG. 16 is a schematic view that shows the nutator head.

FIG. 16 shows a simplified geometric model of a generic head 1 (nutator head). It is assumed as an example that the axes runs are A [0;360] B [−180;180]

The parameters (or errors to be measured) in this model are:

Angular positioning accuracy for axes A and B.
Direction and rotation centre for axes A and B.
Zero pre-set for axes A and B.
DTx, DX, DTy, DY and P. The angle ($\alpha$) of 45° is assumed as known. The measures to be carried out are 5 and the support base 11 settings are always those of the basic configuration.

As in the previous case in FIG. 16, the rotation axes are shown as parallel to the theoretical configuration (axis A parallel to axis Z and axis B in plane XZ at 45° from axis X). In practice this is obtained after having measured and corrected the parallelism between rotation axes and linear axis and obtained the 0 pre-sets.

The measuring procedure consists in the following steps:

Step 1:

As in the previous case, a circle is performed for measuring axis A. B is placed at 180° (gage tool in plane XY) and the measure is performed by moving A from 0 to 360 degrees.

The operations to be performed are the same ones and it is thereby obtained: angular positioning accuracy for axis A; parallelism between rotation axis A and axis Z; 0 pre-set for axis A for which the gage tool lies in plane XZ.

Step 2:

As in the previous case, a circle is performed for measuring axis B. A is placed at 0° and the measure is performed by moving B from −180 to +180 degrees.

The series of points describe a circle that lies on a plane that ideally should intersect plane YZ in a straight line parallel to Y and plane XZ in a straight line slanted by −45° with respect to X. Deviations from such configuration will be parallelisms corrections for axis B.

As previously the corrections are detected in order to correct the angular positioning accuracy for B and the 0 pre-set for which the gage tool is vertical.

Like in the previous example, being known both for axis A and for axis B transducer linearity, parallelism between rotation axes and linear axis and zero pre-set, the head has been driven to the condition described in FIG. 16.

Figure 17:
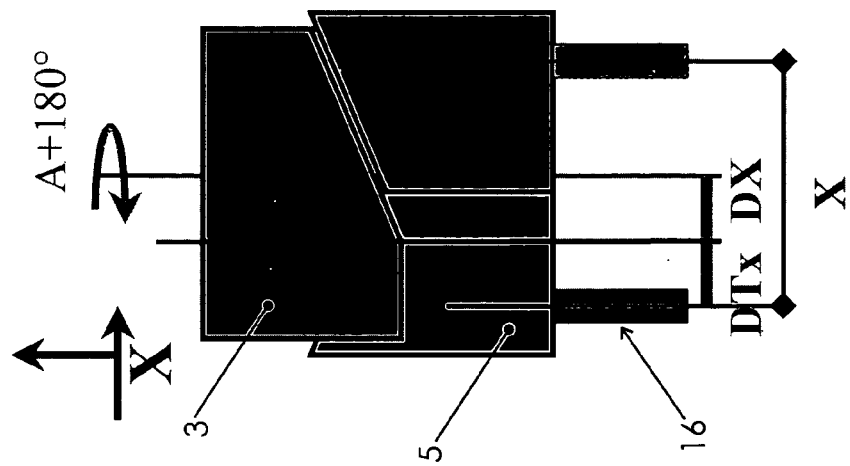

Step 3:

In FIG. 17, the following is applied:

Movement:
A0=>180
B0

Relationship:
DTx+DX=X

Step 4:

In FIG. 18, instead, the following is applied:

Movement:
A0
B0=>180

Relationship:
P−DTx=X

Step 5:

In FIG. 19, the following is applied:

Movement:
A0=>180
B180

Relationship:
2P+2DX=X

Figure 20:
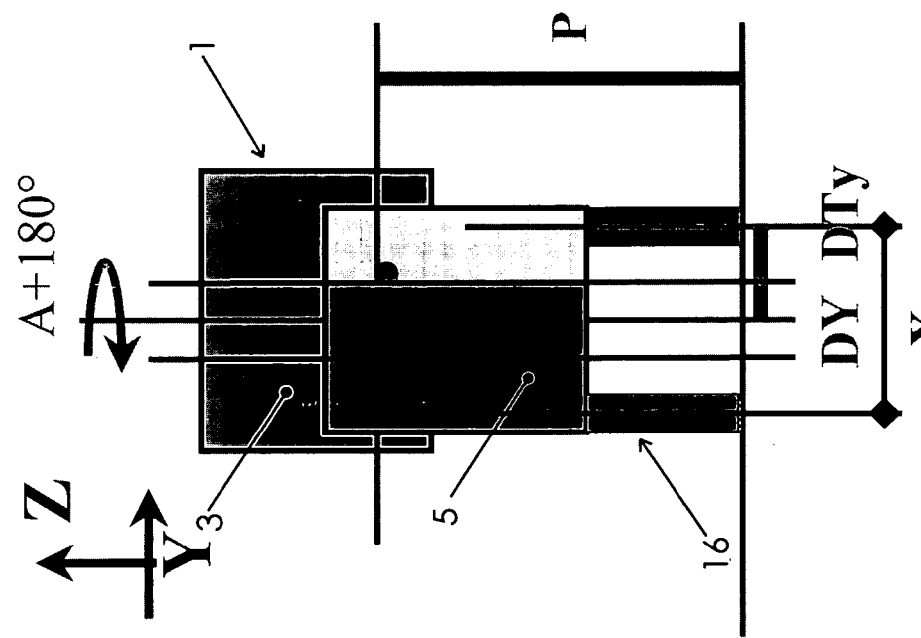

Step 6:

In FIG. 20, the following is applied:

Movement:
A0=>180
B0

Relationship:
2DY+2DTy=X

Figure 21:
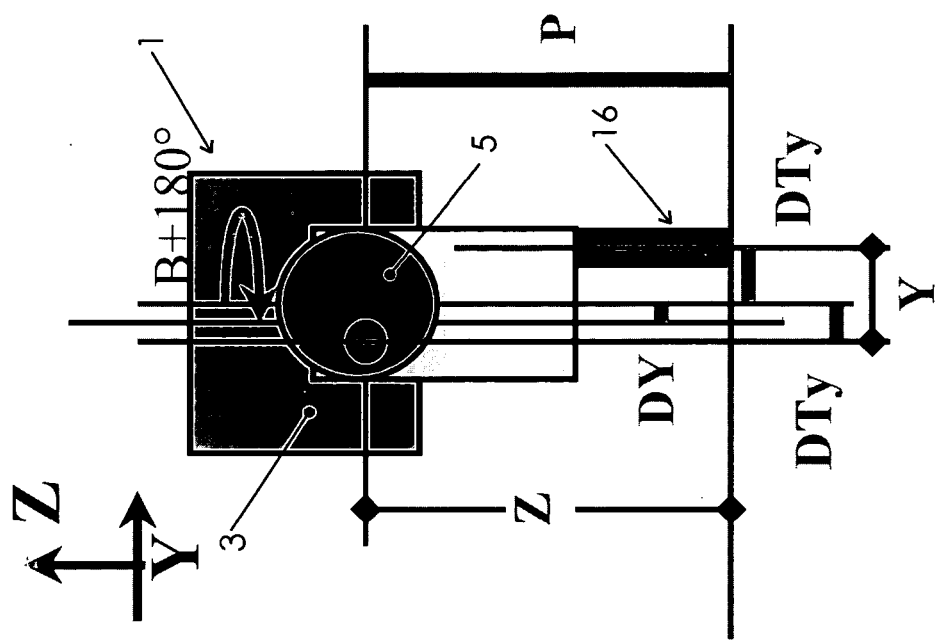

Step 7:

In FIG. 21, the following is applied:

Movement:
A0
B0=>180

Relationship:
2DTy=Y
P=Z

The equations found in steps 3 to 7 are all independent and their resolution is mathematically able to be demonstrated.

If angle $\alpha$ shown in the Figures is not 45° and is not known with accuracy, by using the analytical method described below, such angle would be measurable.

EXAMPLE 2

Figure 22:
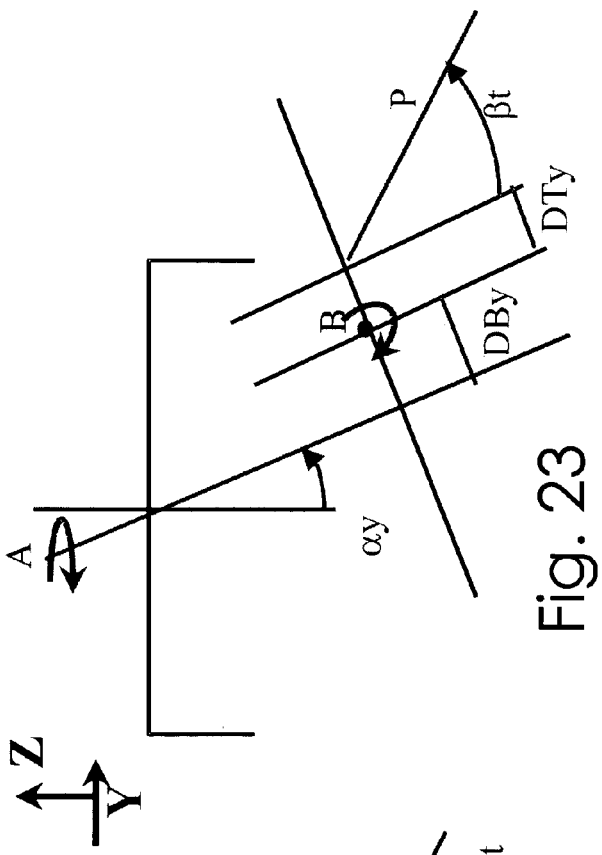
FIGS. 22 to 24 are vector graphs that show the actions of the head model of the present invention.
Figure 23:
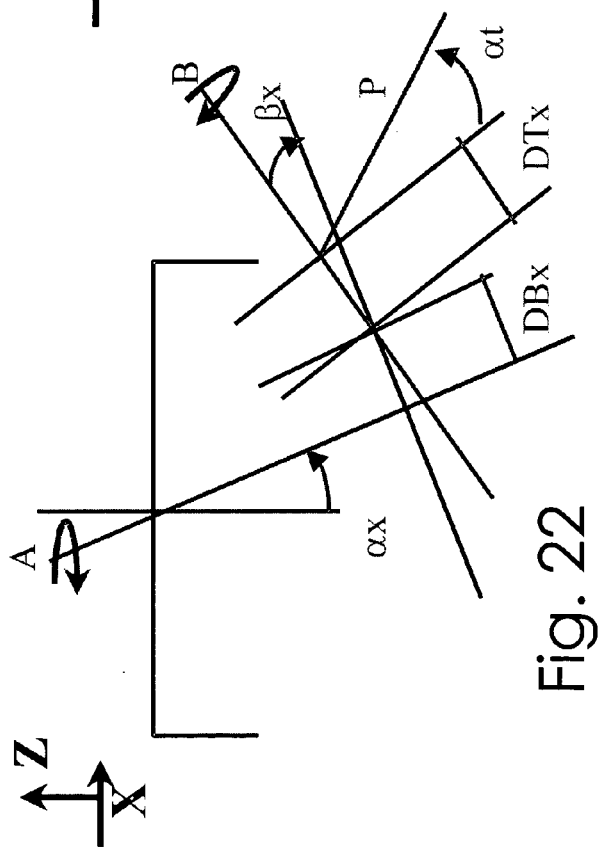
Figure 24:
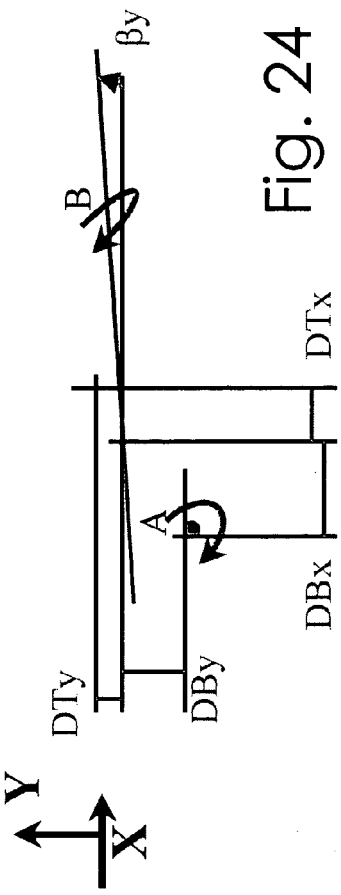

FIGS. 22 to 24 show an advanced geometrical model of a generic head 1. The parameters (or errors to be measured) of this model are: $\alpha x$, $\beta x$, DBx, DTx, P, $\alpha t$, $\alpha y$, $\beta y$, DBy, DTy, $\beta t$.

In these models the non-parallelisms are pointed out for the rotation axes with respect to linear axis ($\alpha x$, $\beta x$, $\alpha y$, $\beta y$). Such parameters are measured with the same procedures mentioned in steps 1 and 2 which further allow obtaining the transducer linearity and the 0 preset value.

Figure 14A:
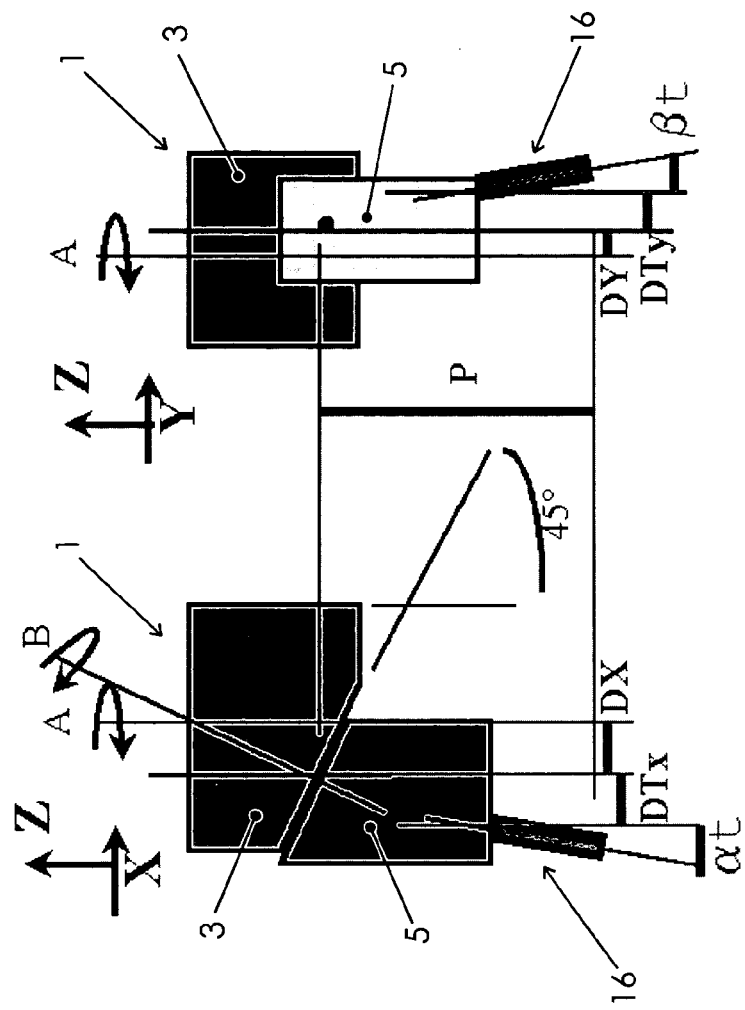
FIGS. 14A and 14B are schematic views that show a further application example of the system of the invention.

Having measured such parameters and by activating the compensation software or taking into account such values within the measuring software, it can be ideally assumed to have corrected such errors and have transformed the affected head into a simpler model (see FIG. 14A).

Figure 14B:
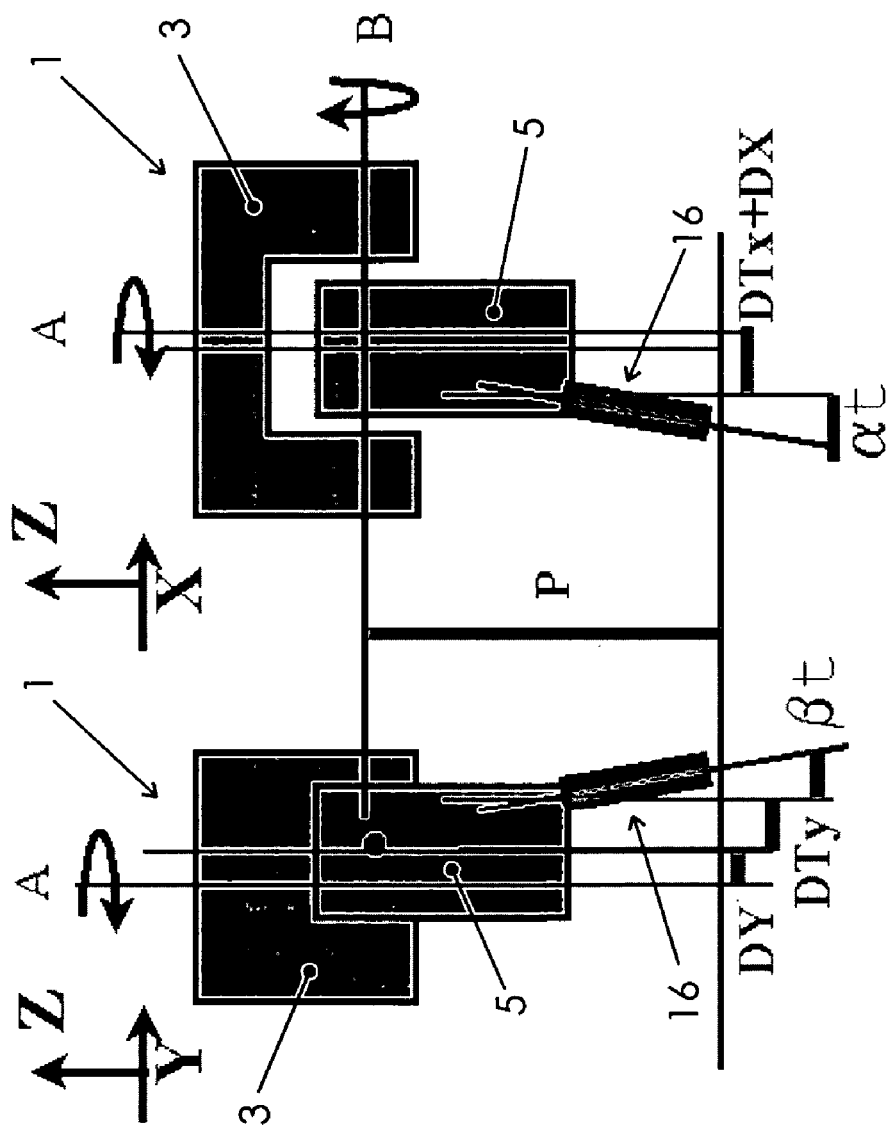

Or, according to which is the reference model, see the example in FIG. 14B.

As an example refer to the case in the second figure.

With respect to the model in example 1, we have parameters $\alpha t$ and $\beta t$ more and thereby performing steps 3 to 6 plus other two steps that describe independent positions and equations, again a series of equations is found that are arithmetically able to be solved. It must be noted that for this model DTx+DX is a single variable (from now on DX).

The steps therefore are:
Step 3: positions A=0 B=0 and A=180 B=0
Relationship: $2*(DX+P*\sin(\alpha t))=X$
Step 4: positions A=0 B=0 and A=180 B=0
Relationship: $2*(DY+DTy+P*\sin(\beta t))=Y$
Step 5: positions A=0 B=−90 and A=180 B=90
Relationship: $2*(DTy+P*\sin(\beta t))=Z$
Step 6: positions A=0 B=−90 and A=180 B=−90
Relationship: $2*(DY+P*\cos(\beta t))=Y$
Step 7: positions A=0 B=−90 and A=0 B=90
Relationship: $2*(P*\sin(\beta t))=Y$
Step 8: positions A=0 B=0 and A=0 B=−90
Relationship: $P*\sin(\beta t)-DTy-P*\cos(\beta t)=Y$
$P*\sin(\beta t)+DTy+P*\cos(\beta t)=Z$ Summarizing the processes disclosed in Examples 1 and 2, it is still possible to locate the following macro-steps for a generic head 1:

1. for a head (20), there are planes in which the circumference described by the tool tip lies when the following movements are realized:
   axis B at 90°; axis A that performs one revolution (circle 1)
   axis A at 0°; axis B that performs one revolution (circle 2), these planes are perpendicular and parallel to machine tool Cartesian axes; such process comprises the steps of:
   executing the circle 1;
   rebuilding with mean square methods or the like the circle 1 through a series of points describing it;
   locating the non-parallelism of the plane passing through the circle 1 with respect to the plane that is orthogonal to the ideal rotation axis of axis A;
   locating the relationship between position transduced by axis A measuring systems and related tool tip location point and then computing the angular positioning accuracy of axis A;
   executing the circle 2;
   rebuilding with means square methods or the like the circle 2 through a series of points describing it;
   locating the non-parallelism of the plane passing through the circle 2 with respect to the plane that is orthogonal to the ideal rotation axis for axis B;
   locating the axis A position 0 through the component of the previously described angles that lies in the plane perpendicular to the ideal rotation axis of axis A;
   locating the axis B position 0 through the measured point on circle 2 that allows having the tool as vertical; and
   locating the relationship between position transduced by axis B measuring systems and related tool tip positioning point and then computing the angular positioning accuracy of axis B 2. According to the geometric model of the head 1 that has to be described, and therefore to the number of parameters that are still not known, a sequence of positionings of the head 1 is performed, adapted to obtain algebraic equations that link the above parameters to the measured errors; such equations must be linearly independent and must be equal to the number of parameters to be determined.

EXAMPLE 3

The geometric model complexity could further increase (therefore increase the number of model parameters) till the search of solutions through algebraic equations that describe independent positions is made difficult. In this case more complex mathematics and more sophisticated solution algorithms could simply be adopted.

More complex models are, for example, the Rodriguez-Hamilton models that describe the 6 degrees of freedom for coupling two bodies. In this case our error model would have 6 degrees of errors for axis A movement, 6 for B axis movement and 6 for gage tool rotation in the spindle.

In order to solve such type of problem, known techniques can be adopted that solve mathematical problems or models depending on a series of experimental measures (our error measures in the different head positions). These techniques are based on minimizing mean square errors or on using neural algorithms (as known in the art, for example, from: Kim K., Kim M. K. "Volumetric Accuracy based on Generalized Geometric Error Model in Multi-Axis Machine Tool", Mec. Mach. Theory, Vol. 26 (1991) No. 2, pages 207-219; Duffie N. A., Yang S. M., "Generation of Parametric Kinematic Error-Compensation Functions for Volumetric Error Measurements", Annals of the CIRP, Vol. 34/1/1985, pages 435-438; D. R. Hush et al., "An Overview of Neural Networks", Informàtica y Automàtica, vol 25, 1992; T. Moriwaki, C. Zhao, "NN Approach to Identify Thermal Deformation of Machining Center", Human Aspects in Computed Integration; and J. C. O'Brien; J. R. Leech, "Can Neural Nets Work in Condition Monitoring", Comadem 92 , 1992, pages 88-93).

The result provided by such techniques is a computation engine that, given the desired model, acquires measures till the model is solved by discarding redundant measures or measures that create bad problem conditionings and solution instability.

This process allows extending the patent applicability to every kind of configuration of head 1 and/or head with table. The model can thereby arrive to such complexities as to also take into account possible positioning errors of the ball 20 of the gage tool 16 deriving from movement errors of the linear axis (those that move the head 1).

If the error compensation software that resides in the CNC has not the same degree of complexity of the measuring software, the same measuring software would perform the translation of parameters in its model into the parameters of the compensation software module. The requirement of such translation is always obtaining the least degree of residual errors in the head 1.

EXAMPLE 4

As regards the measuring process for the errors that cannot be modeled, all errors not included in the geometric model being used are still a reason for positioning errors as regards programmed movements of the head 1 axis.

For such errors it is thereby possible to establish only an empirical link with the position of the head 1 axis. The relationship will thereby be univocal. Given a position of the two half-bodies A and B, there are three error values DX, DY and DZ in positioning the tool tip. The only algebraic relationship is linked to the tool length, such relationship being able to be established only by identifying the three values DX, DY and DZ, for a given A and B, with two tool length values (therefore the measures for every head 1 position are two, with two gage tools 16 with a known and distinct length). For a generic tool length, the error is a linear interpolation of the pair of three measured values DX, DY and DZ.

The measuring process is therefore measuring errors DX, DY and DZ of the ball 20 of the gage tool 16 for all affected positions A and B. The measures are carried out first with a gage tool 16 and then with the following gage tool 16. The affected positions could be all combinations of positions of the two axes from their negative end to their positive end, discretizing with a step to be empirically found or with analysis algorithms for error frequencies.

The measure of errors that cannot be modeled is described and solved more widely in document WO-A-00/003312 of the same Applicant of the present invention. In fact, the measure of errors that cannot be modeled is not per se an innovation of the compensation method (already described in the above document), but instead in this case the application of sensors 14 and support base 11 is relevant in order to automatically perform also this type of measures.

It is necessary to underline that a similar measuring process can be performed by using a digital feeler pin (assembled on a spindle nose) and a reference ball (placed in the machine working area).

The parameter input table for such static error compensation software will be composed as follows:

| Position A | Position B | Gage tool length | DX | DY | DZ |
|---|---|---|---|---|---|
| [negative end of stroke] | [negative end of stroke] | Length 1 | # | # | # |
| ... | [negative end of stroke] | Length 1 | # | # | # |
| [positive end of stroke] | [negative end of stroke] | Length 1 | # | # | # |
| [negative end of stroke] | ... | Length 1 | # | # | # |
| ... | ... | Length 1 | # | # | # |
| [positive end of stroke] | ... | Length 1 | # | # | # |
| [negative end of stroke] | [positive end of stroke] | Length 1 | # | # | # |
| ... | [positive end of stroke] | Length 1 | # | # | # |
| [positive end of stroke] | [positive end of stroke] | Length 1 | # | # | # |
| [negative end of stroke] | [negative end of stroke] | Length 2 | # | # | # |
| ... | [negative end of stroke] | Length 2 | # | # | # |
| [positive end of stroke] | [negative end of stroke] | Length 2 | # | # | # |
| [negative end of stroke] | ... | Length 2 | # | # | # |
| ... | ... | Length 2 | # | # | # |
| [positive end of stroke] | ... | Length 2 | # | # | # |
| [negative end of stroke] | [positive end of stroke] | Length 2 | # | # | # |
| ... | [positive end of stroke] | Length 2 | # | # | # |
| [positive end of stroke] | [positive end of stroke] | Length 2 | # | # | # |

The error compensation software of the head 1 resides in the CNC. It is also divided into a part that performs the head movements compensation using a geometric model and a part that is the software that performs the compensation of static, that is "non geometric" (not able to be modeled) errors.

The compensation algorithms are not characterized by any degree of innovation since they are already known and they will not be further described.

As regards the dynamic head test, the above-described system of the invention can be used for checking the dynamic behaviour of the controlled axes of the heads 1 and/or the movements of these axes combined with those of the linear axis.

By controlling through the control system 34 the movements to single machine axes, the real response on the tool tip can be observed similarly with other control means (for example the KGM system manufactured by Heidenhain).

Moreover, by controlling the combined movements between linear and rotating axes, adapted to obtain that the tool tip (now the ball 20) keeps its position in the space even during acceleration transients, the real response curve on the tool tip can be recorded.

The response curve analysis of the axes compared with the programmed one would allow analyzing typical problems like "twitching" and "ripple".

The only requirement in order to be able to perform this type of test is a pass-band that is enough for the signal sampled by the system of the invention. The related pass-band can be evaluated in about 1 kHz.

It has thereby been disclosed that the system of the invention is able, through a single measure obtained by the sensors 14 and related to the distance that separates the sensors 14 themselves from the ball 20, to detect the XYZ coordinates of the center of a tool in a position of interest, instead of having, like in the prior art, to perform inaccurate measures, or measures that are not located in the XYZ space, or also measures that do not reconstruct the tool position in the real position of interest.

EXAMPLE 5

The herein below described solution is the description of a practical arrangement resulting from joining together the concepts disclosed in Examples 1, 3 and 4.

The following components have been used in this example:

HMS: measuring system composed of 3 distance sensors that provide an incremental digital signal from which their position is directly derived. Such system must be placed on the machine tool table that has the head to be measured.

Test cylinders: 2 test cylinders with ball end whose length and diameter are known. Such cylinders are assembled, through a suitable adapter, on the head spindle.

Measuring SW: the software that performs the measuring procedures and computes the corrections.

Herein below, as an example, reference will be made to a fork-shaped head where the first rotating axis is C and rotates around Z while the second rotating axis is A and rotates around X when C is 0.

Axis strokes will be:
axis C from −180 to 180 degrees,
axis A from −90 to 90 degrees.

The sensors are arranged along the edges of a tetrahedron. Then, seen in plan view, they form an angle of 120 degrees one to the other while then they form an angle of 55 degrees with respect to the horizon.

The reason for the tetrahedron arrangement is avoiding collisions between the sensors and the test cylinder at least in all slants of the positive ball overhanging the device.

The reason for the 55 degrees is avoiding collisions also with the spindle to which the test cylinder is connected. A greater slant would remove further collision problems, thereby providing a wider measuring range to the system, while a lower slant tends to better balance the measuring resolution in orthogonal directions XYZ. 55 degrees is thereby evaluated as the best compromise.

The system measuring position is the one for which the test cylinder ball simultaneously touches the three sensors, reaching for each one of them the value for which the axis of the three sensors simultaneously passes through the ball center. Consequently in such position the tip of every sensor touches the ball in a tangent point, and the plane perpendicular to the sensor axis is tangent to the ball. To simplify, it is assumed that the system is arranged so that the tetrahedron described by the three sensors has its base on the plane XY and the test cylinder is directed in a negative direction with respect to Z when A and C are 0.

The system calibration consists in determining:
the previously described measuring position, and
the directing cosines of the three sensors.

The measuring software, for every head position, has available:
the absolute position of rotating axes (C, A) provided by the axis measuring system,
the absolute position of linear axes (X, Y, Z) provided by the axis measuring system,
the absolute position of the three sensors (S1, S2, S3).

In order to determine the measuring position (from now on called "position 0" or "sensors position 0"), the software requires that:
the ball is previously taken in contact with the sensors,
the position value of the three sensors is given, for which such position is defined (this is a construction data related to system construction geometry referred to ball diameter).

After this:
1.) a movement Z is carried out along a negative direction till at least one of the three sensors has reached the center value;
2.) from the reached position, a movement X is carried out and, depending on values recorded at movement start and arrival, for every sensor the gain is determined with respect to movements along machine direction X. Namely, the ratio is determined between value variation of every sensor and X variation at the movement ends;
3.) after having returned to the starting point (the one determined at the end of movement 1), an operation similar to step 2 is carried out to determine, for every sensor, the gain with respect to movements along direction Y, then the movement is carried out along direction Y;
4.) a series of movements XY are carried out, adapted to search for the values S1, S2, S3 that better approximate position 0. Since probably position Z is not the correct one, the searched values are those for which this position is defined apart from a scale factor. Then, depending on previously computed gains, step by step there are determined movements XY, which every sensor would require to assume value 0. It must be taken into account that the search was successful if the values are determined apart from a certain tolerance. If the search does not converge, it is stopped and restarted from step 1. This occurs when the starting position was for the step 1 to load the sensors in an unequal way so that steps 2 and 3 determined very different gains with respect to the ones in point 0. The first iteration in step 4 anyway has allowed to adequately approach such condition. Then, the new execution of steps 1, 2 and 3 provides stronger values that will take step 4 to converge;
5.) if step 4 has reached the convergence, a movement Z is again carried out since step 4 has determined position 0 apart from a scale factor for S1, S2 and S3.

In order to determined directing cosines for the three sensors, starting from the previously determined position 0, a series of movements XYZ are carried out, adapted to determine, for every sensor, the relationship (gain) between sensor measure and movement of one of linear axes. This is determined with search algorithms that are based on the fact that, for position 0, where the sensors axis passes by the ball center and the plane perpendicular thereto is tangent to the ball, the following is valid:
describing a curve that has as abscissa the angle, in plane XY, formed by a movement XY that starts from position 0 and as ordinate the elongation value of a sensor for such movement, such curve has a single maximum coinciding with the movement XY whose angle coincides with the projection in XY of the sensor axis;
having determined through the previous step the direction in XY of every sensor, a similar principle is valid for the curve described by movements XYZ for which the straight line along which the movement is carried out lies in the plane perpendicular to XY and oriented according to the angle XY determined in the previous step. The curve has, as abscissa, the angle formed by movements XYZ with respect to plane XY and as ordinate the elongation value of a sensor. The curve maximum points out in this case the movements XYZ in which the performed distance coincides with the elongation that the examined sensor had. The ratio between sensor elongation and movements X, Y and Z for this last position are the searched gains.

The measure principle is based on the fact of being able to drive the ball to position 0.

For every sensor the following are known:
directing cosines Kx#, Ky#, Kz#, where # represents the current sensor (1, 2, 3),
the sensor value in position 0 (S0#).

For a generic ball position, described by XYZ and S1, S2 and S3, the following are determined:
Movement X required by sensor #=MX#=(S0#−S#)×Kx#
Movement Y required by sensor #=MY#=(S0#−S#)×Ky#
Movement Z required by sensor #=MZ#=(S0#−S#)×Kz#
Then the required movement will be:
Axis movement X=MX1+MX2+MX3
Axis movement Y=MY1+MY2+MY3
Axis movement Z=MZ1+MZ2+MZ3

These movements are then carried out by a numeric control system that continuously reads the values S0#-S# and inserts the movements to be carried out, performing suitable acceleration and deceleration logics. The algorithm then operates as if the three sensors are three springs that, connected to the ball, tend to take back the ball to a balanced position, defined apart from a certain tolerance, that in principle coincides with position 0 but must not compulsorily do so. In fact, in order to best calibrate the search algorithm for the balanced position, the values S0# are placed equal to the value that the sensors assume in their balanced position as soon as it is possible to reach it for the first time.

Then, in practice, the calibration procedure, that determines point 0, for which S#=S0#, and directing cosines Kxyz#, has not the purpose of exactly determining the HMS arrangement but the purpose of providing to the previously described algorithm, data that allow always determining a balanced position for the ball. In practice this balanced position can represent, in the Cartesian space, an always identical position of the ball, that modifies the sensors contact according to a possible ball rotation, and to approximations and computation tolerances of the algorithm, that, being a system for successive and continuous approximations, will tend to minimize them.

The major advantages of this procedure are:
  the search for the balanced position is minimally affected by the accuracy with which S0# and Kxyz# have been determined, and thereby the calibration algorithms are particularly simple and quick,
  no computation complexity is added if the S0# of the three sensors are different as well as if the sensors are not exactly oriented along the sides of the ideal tetrahedron. This allows realizing the HMS without particular restrictions on dimensional tolerances both of components and of assembling, and allows placing the HMS on a machine tool without particular care for its orientation,
  if during the measures, thermal effects distort the HMS morphology, the influence on Kxyz# values has no reflexes on search stability for the balance point and therefore for the measures that have to be carried out. Therefore it is useless to carry out again the calibration and the system is particularly stable,
  the search for the balance position is quick and therefore the measure of an individual point is particularly efficient.

These advantages are difficult to be obtained with any other system whose purpose is identifying the relationship that directly links, for a given triad of sensor values, the corresponding position value XYZ.

Then, it is now possible to deem that it is safe to ask the system to take back the ball to such a position that this position will always be the same, if referred to an inertial Cartesian system, apart from:
  ball sphericity error (the ball can be easily obtained with sphericity tolerances lower than 2 micrometers),
  position accuracy for machine axes XYZ,
  computation accuracy (practically neglectable),
where the greatest, and practically the only, influence is given by machine positioning accuracy.

It will be possible to state that the system "centers the ball" when it carries out such operation.

A correct calibration is easily checked by performing a series of positionings XYZ and verifying that, starting from such positioning, the reached balance point is always the same point XYZ apart from a certain tolerance.

As regards the measure of a point, it must be remembered that the measuring software has available, for each head position:
  the absolute position of rotating axes (C, A) provided by the axis measuring system,
  the absolute position of linear axes (X, Y, Z) provided by the axis measuring system,
  the absolute position of the three sensors (S1, S2, S3).

In practice the system has access to different XYZ values, of which:
  the absolute position of machine axes directly provided by the axis measuring system (XA, YA, ZA, AA, CA) (in MXA1 CNC manufactured by Fidia S.p.A., Italy),
  the absolute position of machine axes provided by the control system after having applied a correction to the one provided by the axis measuring system (X, Y, Z, A, C); this transformation, performed by the control, is adapted to correct the values provided by the measuring systems in order to approach the XYZ system to an inertial Cartesian reference system (in Fidia MXA1 CNC),
  the relative ball center position (XL, YL, ZL); depending on XYZAC values, on geometric ball shaping data and on test cylinder dimensions, the numeric control provides the supposed ball center position (in Fidia MXA1 CNC, POSITION with RTCP ON).

Error measures are then carried out according to the following procedure:
  for a given head position 1 (A1, C1), the ball is centered, and absolute and relative XYZ values are recorded (X1, Y1, Z1, XL1, YL1, ZL1),
  the head is moved to position 2 (A2, C2), the ball is centered, and absolute and relative XYZ values are recorded (X2, Y2, Z2, XL2, YL2, ZL2),
  variations of the 2 positions are computed:

$$Dx=X1-X2$$

$$Dy=Y1-Y2$$

$$Dz=Z1-Z2$$

$$DLx=XL1-XL2$$

$$DLy=YL1-YL2$$

$$DLz=ZL1-ZL2$$

Then, for the movement from position 1 to position 0, Dxyz represents, in the Cartesian reference system, the movement that the head must perform in order not to make ball positioning errors, while DLxyz represent the error that is made by such movement. DLxyz are then the error measure provided by the sensors as if they were oriented according to a Cartesian triad.

Movement from position 1 to 2 is carried out by the control taking care that the ball does not abandon the contact with sensors (RTCP function), otherwise it would not be possible to center again the ball.

As regards measuring procedures, it has been pointed out that, given two programmed head positions, the system determines the ball center positioning error and reference system positions XYZ if such errors are null.

Typically, the measuring functions perform two types of measures:
  1.) simple measures that determine Dxyzac and DLxyzac from two or more measuring positions,
  2.) complex measures in which a rotating axis is not moved while the other one performs a series of positionings from a starting position to an end position by performing prefixed steps. By carrying out such measure, the ball, as said, remains ideally unmoving, and the linear axes perform a circle in space. This type of measure will be called the "measure of a circle". The measure of a circle will have the following notation:

○ [Moved axis: C/A]; [starting position in degrees—START]; [end position in degrees—END]; [pitch in degrees—STEP]

P̂ [Fixed axis: A/C]; [Fixed axis position in degrees]

From these measures, lists of values will be recorded that are Dxyzac and DLxyzac of every measure point.

Known computation algorithms are then able to determine, from measures of a circle, geometric entities such as:
  center and radius of the circle described by Dxyzac,
  plane passing through Dxyzac,
  cube curve passing through Dxyzac for a given quadratic error tolerance.

From many measures of circles and from related obtained geometric entities, it is thereby possible to determine values and other geometric entities, such as:
  distance between planes,
  intersections of planes and of planes with cubic curves,
  cones and/or cylinders passing through many circles,
  straight lines tangent to many circles,
  straight lines passing through the center of many circles,
  etc.

The angular head positioning error is corrected by inserting corrections that allow the control to determine A and C given AA and CA.

The computation of such corrections is based on the principle that, after having performed a circle for A or C, the angle, that is determined by joining the center of a circle computed with individual measuring points, represents, apart from a constant, the remaining correction to be inserted to pass from AA and/or CA to A and/or C.

The above mentioned constant depends on the influence of distances between head rotation axes (head misalignments) and the fact that the rotation axes zero position has still not been correctly defined. This constant is removed if these measures are followed for two mirror positions of the axis that is not moved. By averaging the values obtained by the 2 circle measures, the constants mutually cancel because their signs are opposite.

The two arrangements further allow taking into account and averaging also angular errors inserted by the different weight distributions that the head could assume in the two arrangements.

As regards the measuring procedure for the angular positioning error on axis C, such measure allows performing two series of circles for mirror positions of axis A.

|   | Circle 1 | | Circle 2 |
|---|---|---|---|
| ○ | C; −180; 180; [STEP] | ○ | C; −180; 180; [STEP] |
| P̂ | A; +90 | P̂ | A; −90 |

Axis A is slanted at its maximum stroke to obtain the highest possible resolution in computations, namely the circle with maximum radius. If the head has such misalignments that the two circles have different radius, the two positions of A must be chosen also in order to make the circle radius equal in order to keep the computation resolution constant.

Every circle must be performed many times in order to make averages on measures both along a positive direction and along a negative direction, also in order to determine the inversion error of the examined rotating axis.

The difference between programmed position for axis C and computed angle for the straight line joining the circle center and a single measured point XYZ, is the remaining correction to be added to pass from CA to C.

Data computed between the two circles are averaged in order to:
  remove the effects of constants,
  take into account angular errors inserted by the weight that could be distributed differently with A at 90 and −90 degrees.

The final results are anyway translated in order to minimize inserted correction values. Such translation will then be taken into account and corrected during the zero point measure for axis C.

In order to perform this measure, no other parameter must be known.

As regards the measuring procedure of the angular positioning error on axis A, such measure consists in performing two series of circles in order to take into account errors both in XZ and in YZ planes.

|   | Circle 1 | | Circle 2 |
|---|---|---|---|
| ○ | A; −90; 90; [STEP] | ○ | A; −90; 90; [STEP] |
| P̂ | C; 0 | P̂ | C; 90 |

Every circle can be performed many times in order to average the measures both along a positive direction and along a negative direction, in order to also determine the inversion error of the examined rotating axis.

The difference between programmed position for axis A and angle computed for the straight line joining the circle center and a single measured point XYZ, is the remaining correction to be added to pass from AA to A.

Data computed between the two circles are averaged in order to:
  remove the effect of constants,
  take into account angular errors inserted by the different weight distribution with C ad 90 and 0 degrees.

The final results are anyway translated in order to minimize the inserted correction values. Such translation will then be taken into account and corrected during the zero point measure for axis A.

In order to carry out this measure, no other parameter must be known.

On all measured data, the following computations are made:
  concentricity of computed circles,
  mean, standard deviation and band of data differences,
  repeatability on the same position,
  in order to determine the efficiency of collected data.

The rotating axes zero points for a head AC are those for which:
  with C=0 axis A is moved on plane YZ
  with A=0 the test cylinder is perpendicular to plane XY Such values are commonly called "zero preset" of a rotating axis.

The zero preset measure of C consists in performing four series of circles in order to take into account both XZ and YZ planes along many rotation directions of axis A.

|        | Circle 1              |        | Circle 2              |
|--------|-----------------------|--------|-----------------------|
| ○      | A; −90; 90; [STEP]    | ○      | A; −90; 90; [STEP]    |
| ⓟ      | C; 0                  | ⓟ      | C; 90                 |

|        | Circle 3              |        | Circle 4              |
|--------|-----------------------|--------|-----------------------|
| ○      | A; −90; 90; [STEP]    | ○      | A; −90; 90; [STEP]    |
| ⓟ      | C; 180                | ⓟ      | C; −90                |

From circles 1 and 3 a plane is determined and therefore the angle that it forms with plane YZ.

From circles 2 and 4 a plan is determined and therefore the angle that it forms with plane XZ.

The best trade-off for C preset is then searched with averages in order to align the above mentioned planes and then find the best head quadrature.

To carry out this measure, no other parameter must be known.

The zero preset measure for A consists in performing four series of C circles, all with axis A at 0. Every circle is performed with a different test cylinder arrangement.

|        | Circle 1                                  |        | Circle 2                                                 |
|--------|-------------------------------------------|--------|----------------------------------------------------------|
| ○      | C; −180; 180; [STEP]                      | ○      | C; −180; 180; [STEP]                                     |
| ⓟ      | A; 0                                      | ⓟ      | A; 0                                                     |
|        | Cylinder with length L1 in position 1     |        | Cylinder with length L1 rotated by 180 degrees with respect to 1 |

|        | Circle 3                                  |        | Circle 4                                                 |
|--------|-------------------------------------------|--------|----------------------------------------------------------|
| ○      | C; −180; 180; [STEP]                      | ○      | C; −180; 180; [STEP]                                     |
| ⓟ      | A; 0                                      | ⓟ      | A; 0                                                     |
|        | Cylinder with length L2 in position 1     |        | Cylinder with length L2 rotated by 180 degrees with respect to 1 |

The average between circles 1 and 2 and then 3 and 4 allows removing possible errors inserted by non-rectilineity of the test cylinder.

The two found circles describe a cone, also knowing position Z of the two centers, or the difference between L1 and L2.

The cone angle will be the value to be corrected for axis A preset.

The greater L1-L2 is, the greater the computation resolution will be.

In order to carry out this measure, no other parameter must be known.

As regards the head geometry measure, for a head AC the geometric values are as follows:

| Misalignment name | Description |
|-------------------|-------------|
| 1) DXBT           | With C = 0 and A = 0, distance along direction X between C rotating axis and test cylinder axis. |
| 2) DZBA           | With C = 0 and A = 0, distance along direction Y between C rotating axis and A rotating axis. |
| 3) DZAT           | With C = 0 and A = 0, distance along direction Y between A rotating axis and test cylinder axis. |

-continued

| Misalignment name | Description |
|-------------------|-------------|
| 4) RTCPLKS        | With C = 0 and A = 0, distance along direction Y between A rotating axis and test cylinder connection point (point from which the cylinder length is then determined). |
| 5) RTCPANG        | With C = 0 and A = 0, angle in plane XZ between C rotating axis and A rotating axis. |
| 6)                | With C = 0 and A = 0, angle in plane YZ between C rotating axis and A rotating axis. |
| 7)                | Angle in plane XZ between C rotating axis and axis Z. |
| 8)                | Angle in plane YZ between C rotating axis and axis Z. |

6, 7, and 8 cannot be corrected with Fidia controls.

The DXBT measure consists in performing four series of circles in order to take into account both XZ and YZ planes along many rotation directions of axis A.

|        | Circle 1              |        | Circle 2              |
|--------|-----------------------|--------|-----------------------|
| ○      | A; −90; 90; [STEP]    | ○      | A; −90; 90; [STEP]    |
| ⓟ      | C; 0                  | ⓟ      | C; 90                 |

|        | Circle 3              |        | Circle 4              |
|--------|-----------------------|--------|-----------------------|
| ○      | A; −90; 90; [STEP]    | ○      | A; −90; 90; [STEP]    |
| ⓟ      | C; 180                | ⓟ      | C; −90                |

The distance between planes for circle 1 and circle 3, as well as the distance between planes for circle 2 and circle 4 are twice the DXBT.

DXBT can further be determined by searching the value that reduces at a maximum the difference between:

XL of circle 1 and XL of circle 2,

YL of circle 3 and YL of circle 4.

The found value will be the remaining correction to be given to DXBT.

Usually, when possible like in this case, it is more efficient to determine the value of a parameter depending on effects that it produces on ball positioning errors (namely the various XYZL) rather than starting from geometric head data (namely from XYZ).

In order to carry out this measure, the axis C preset must be known, after having previously measured it.

The DZBA measure performs a circle of C with A at 0.

○ C; −180; 180; [STEP]

ⓟ A; 0

The circle radius will be:

$$RADIUS = RADQ(DXBT^2 + (DZBA + DZAT)^2).$$

Being then DXBT known, the sum of DZBA and DZAT is determined.

As first approximation, DZAT will be considered as null and DZBA only is corrected.

Afterwards, the measure to compute DZAT will correct the performed approximation.

In order to carry out this measure, the following must be known, after having previously been measured:

DXBT, axis A preset.

The DZAT measure consists in performing four series of circles in order to take into account both XZ and YZ planes along many rotation directions of axis A.

|  | Circle 1 |  | Circle 2 |
|---|---|---|---|
| ○ | A; −90; 90; [STEP] | ○ | A; −90; 90; [STEP] |
| ⓟ | C; 0 | ⓟ | C; 90 |
|  | Circle 3 |  | Circle 4 |
| ○ | A; −90; 90; [STEP] | ○ | A; −90; 90; [STEP] |
| ⓟ | C; 180 | ⓟ | C; −90 |

At this time, DZAT is null and therefore the control does not perform therefore any compensation of errors YL of circles 1 and 3, while errors XL of circles 2 and 4 will be its image.

Such errors describe a circle since the compensation due by DZAT would be maximum for A=0 and null for A=90 and A=−90.

The radius that better approximates this circle is the best compromise for DZAT. The same value must then be subtracted from DZBA following the approximations inserted by its computation.

In order to carry out this measure, the following must be known, after having previously measured them:

DXBT,
DZBA,
axis A preset.

The RTCPLKS is determined as average of radius of the following circles:

|  | Circle 1 |  | Circle 2 |
|---|---|---|---|
| ○ | A; −90; 90; [STEP] | ○ | A; −90; 90; [STEP] |
| ⓟ | C; 0 | ⓟ | C; 90 |
|  | Circle 3 |  |  |
| ○ | C; −180; 180; [STEP] |  |  |
| ⓟ | A; 90 |  |  |

To carry out this measure, everything must be known, after having previously measured it.

As regards the RTCPANG measure, the projection in XZ of the circle plane vector:

○A; −90; 90; [STEP]
ⓟ C; 0 is the RTCPANG value.

Regarding the test cylinder, its length (measured from the point where the RTCPLKS measure ends till the tip of the cylinder itself) and the ball diameter must be known.

Once having assembled the cylinder in the spindle, due to its shape or due to assembling, the ball center could have deviations from the spindle axis.

Such deviations generate a direct error in measuring the DXBT and DZAT parameters.

Once having known these deviations, it is possible to carry out the above described measures and at the end simply subtract these values from DXBT and DZAT.

In order to measure these values, the following procedure can simply be carried out:

assemble the test cylinder in the spindle
carry out the ball centering and record XL, YL and ZL,
rotate the cylinder by 180 degrees in the spindle,
carry out the ball centering again and record XL, YL and ZL,
half of the difference between values of the two measures are the searched values.

Since the manufacture of the test cylinder and the adapter to assemble it on the spindle tends to minimize at a maximum deviations of the ball center with respect to spindle axis, measures along directions X and Y will be small values, while the measure along direction Z will be their consequence and by at least two order of magnitude lower. The error along direction Z will then be neglectable.

Since the previous measure is affected by the accuracy with which the 180-degree rotation is performed, another method to determine the same values is:

assemble the test cylinder in the spindle,
carry out a ball centering and record XL, YL and ZL,
repeat the same operation by rotating the cylinder at 90-degree pitches and recording XL, YL and ZL,
by carrying out the rotation and measuring operations four times, the angular positions in which it is assumed to have rotated the cylinder will be:
starting position 0,
position 90,
position 180,
position 270,
return to starting position.

In this case it is assumed that one has been able to obtain angular positions approximate to ±5 degrees. In this case the problem is determining:

the circle that passes through the list of measured points XL and YL. Since the points are five, the circle and its radius can be obtained with the minimum square method,
determine the final angle at which the cylinder is placed. Being circle center and radius known in the same coordinate system of XL and YL, such value can be determined algebraically and the circle radius can be correctly decomposed in test cylinder misalignment values.

It is clear then that the cylinder must not be moved any more once having located its misalignment values unless one has again to carry out the calibration.

As regards the dependency on measures, X points out the values that affect the measures and that therefore must be previously be measured.

√ points out the values that affect the measures but that are kept into account by the measuring procedure itself and then are removed during computations.

Dependencies refer to the previously shown measuring procedures.

| Measure of: | DXBT | DZAT | DZBA | RTCPLKS | PRESET A | PRESET C | T.c.c.* |
|---|---|---|---|---|---|---|---|
| Angular position C | √ | | | | | √ | √ |
| Angular position A | | √ | √ | | | | √ |
| PRESET C | | | | | | | |
| PRESET A | | √ | | | | | √ |
| DXBT | | | | | | X | X(*) |
| DZBA | X | √ | | X | | | |
| DZAT | X | | X | X | | | X(*) |
| RTCPLKS | X | X | X | X | | | X |
| RTCPANG | | | | | | X | |

T.c.c.: Test Cylinder Coaxiality
(*)Like for other measures, the X-type influence presumes the knowledge of the influence value in order to correctly determine the measured parameters. Otherwise, for these cases, it is noted that the dependency must be solved a posteriori. For example, while for DXBT the PRESET C must be known, measured and corrected in order to correctly perform the DXBT computation algorithm, instead in the DZAT case, the non-coaxiality cylinder valuehas no influence on computation algorithms since the measure result will in practice be a value that is equal to DZAT + cylinder non-coaxiality. Then the correct DZAT value will be: measuring and computation algorithm result - cylinder non-coaxiality. The same holds for DXBT, always referred to test cylinder non-coaxiality.

The system is also able to carry out an approximate error check for axes XYZ and also AC that will not be able to correct since they cannot be included in head corrections.

As regards the rotation planarity check for axis C and the rectilineity check for linear axes XY, the following circles are performed:

| Circle 1 | | Circle 2 | |
|---|---|---|---|
| ○ | C; −180; 180; [STEP] | ○ | C; −180; 180; [STEP] |
| ⓟ | A; 90 | ⓟ | A; −90 |

Taking into account that position A-90C180 corresponds to position A90C0, as well as position A-90C-90 corresponds to position A90C90 and so on, data are ordered and the following is computed:
- the circle that passes from even points at half of differences among values of X, Y and Z. The vectors of such circle plane represent the rotation planarity errors of axis C.
- the curves for even points at half of the sum of values of X, Y and Z. Such curves represent the rectilineity errors of axes X and Y along direction Z.

As regards the orthogonality check for axes XYZ, the following circles are performed:

| Circle 1 | | Circle 2 | |
|---|---|---|---|
| ○ | C; −180; 180; [STEP] | ○ | C; −180; 180; [STEP] |
| ⓟ | A; 90 | ⓟ | A; 0 |

The difference in X and Y of the circle centers represents the orthogonality error of axis Z with respect to X and Y.

As regards the axis scale check, the following circle is performed:
○ C; −180; 180; [STEP]
ⓟ A; 90

For such series of data, the following are determined:
the radius of the circle that best approximates them,
the axes of the ellipse that best approximates them.

The difference between circle radius and ellipse axes is a scale error in data provided by XY measuring systems.

As regards the rotation check for axis C, the following circle is performed:
○ C; −180; 180; [STEP]
ⓟ A; 90

The offset of the curve of Z values from a simple sinusoid period (that would be the effect of C non-planarity) is the rotation axis swinging for axis C.

As regards the rotation check for axis A and the rectilineity check for linear axes XYZ, the following circles are performed:

| Circle 1 | | Circle 2 | |
|---|---|---|---|
| ○ | A; −90; 90; [STEP] | ○ | A; −90; 90; [STEP] |
| ⓟ | C; 0 | ⓟ | C; 180 |

Taking into account that position A-90C180 corresponds to position A90C0, as well as position A90C180 corresponds to position A-90C0 and so on, data are ordered and the following is computed:
from half of the differences of values of X, Y and Z the rotation errors for axis A,
at half of the sums of values of X, Y and Z the rectilineity errors of axis Y along direction X.

By instead performing the circles:

| Circle 1 | | Circle 2 | |
|---|---|---|---|
| ○ | A; −90; 90; [STEP] | ○ | A; −90; 90; [STEP] |
| ⓟ | C; 90 | ⓟ | C; −90 | the same values are obtained for axis A and furthermore the rectilineity errors of axis X along direction Y.

By finally composing the data of the four circles, it is further possible to extract from rotation errors for axis A, the rectilineity influence of axis Z.

The measure of remaining errors collects data in XL, YL and ZL for all positions of A and C that describe their whole strokes for a predefined pitch. In practice the XYZ value would describe a ball portion.

This is carried out with two test cylinders with different length and by rotating them by 180 degrees to remove, performing their averages, the influences of its lack of axiality. Then the sets of performed measures are four.

The collected data are used to fill-in the following table:

| Position A | Position B | Bar length | DX | DY | DZ |
|---|---|---|---|---|---|
| [negative end of stroke] | [negative end of stroke] | Length 1 | # | # | # |
| . . . | [negative end of stroke] | Length 1 | # | # | # |
| [positive end of stroke] | [negative end of stroke] | Length 1 | # | # | # |
| [negative end of stroke] | . . . | Length 1 | # | # | # |
| . . . | . . . | Length 1 | # | # | # |
| [positive end of stroke] | . . . | Length 1 | # | # | # |
| [negative end of stroke] | [positive end of stroke] | Length 1 | # | # | # |
| . . . | [positive end of stroke] | Length 1 | # | # | # |
| [positive end of stroke] | [positive end of stroke] | Length 1 | # | # | # |
| [negative end of stroke] | [negative end of stroke] | Length 2 | # | # | # |
| . . . | [negative end of stroke] | Length 2 | # | # | # |
| [positive end of stroke] | [negative end of stroke] | Length 2 | # | # | # |
| [negative end of stroke] | . . . | Length 2 | # | # | # |
| . . . | . . . | Length 2 | # | # | # |
| [positive end of stroke] | . . . | Length 2 | # | # | # |
| [negative end of stroke] | [positive end of stroke] | Length 2 | # | # | # |
| . . . | [positive end of stroke] | Length 2 | # | # | # |
| [positive end of stroke] | [positive end of stroke] | Length 2 | # | # | # |

The numeric control searches and interpolates in such table the values that allow it to compute the correction along direction XYZ for a given position of A and C and a given tool length.

Although the present invention has been discussed in considerable detail with reference to certain preferred embodiments, other embodiments are possible. Therefore, the scope of the appended claims should not be limited to the description of preferred embodiments contained in this disclosure. All references cited herein are incorporated by reference to their entirety.

What is claimed is:

1. A system for measuring, compensating and testing numerically controlled machine tool heads and/or tables, characterized in that it comprises:
    at least one support base equipped with a plurality of distance sensors; and
    at least one device of the gage tool type composed of an elongated cylinder, said cylinder being equipped at one of its ends with connection means for said heads and being equipped at another opposite end with a ball, said ball being placed next to said sensors so that they are able, always and in any position, to measure a distance that separates them from said ball;
    wherein the system is operatively canceled with processing means, said processing means being adapted, through a single measure obtained by said sensors about a distance that separates said sensors from said ball, to detect the XYZ coordinates of a center of a tool in a position of interest; and
    wherein said processing means comprise means for performing measure processes for errors that can be modeled, means for performing measure processes for errors that cannot be modeled and means for performing dynamic checks.

2. The system according to claim 1, characterized in that said support base is of a circular shape and is equipped with three distance sensors placed on the base in positions that are mutually offset by 120°.

3. The system according to claim 1, characterized in that said connection means are of a tapered shape and said heads are adapted to receive, in one of their moving parts, said connection means for the unmovable connection thereto during the measures.

4. The system according to claim 1, characterized in that said heads are operatively coupled and integrated with CNC test and control means also comprising means for performing compensation processes for errors that can be modeled and means for performing compensation processes for errors that cannot be modeled.

5. The system according to claim 1, characterized in that said support base is connected to bearing means adapted to allow a rotation of said support base up to 90° with respect to its own axis, in order to reach a plurality of operating positions between two mutually perpendicular extreme axes, said bearing means being further adapted to simultaneously allow a rotation of said support base, once having reached the extreme axis position, around the axis perpendicular thereto.

6. A process system for testing numerically controlled machine tool heads and/or tables using a system for measuring, compensating and testing numerically controlled machine tool heads and/or tables, characterized in that it comprises: at least one support base equipped with a plurality of distance sensors; and at least one device of the gage tool type composed of an elongated cylinder, said cylinder being equipped at one of its ends with connection means for said heads and being equipped at another opposite end with a ball, said ball being placed next to said sensors so that they are able, always and in any position, to measure a distance that separates them from said ball; wherein the system is operatively coupled with processing means, said processing means being adapted through a single measure obtained by said sensors about a distance that separates said sensors from said ball, to detect the XYZ coordinates of a center of a tool in a position of interest; and wherein said processing means comprise means for performing measure processes for errors that can be modeled, means for performing measure processes for errors that cannot be modeled and means for performing dynamic checks for testing numerically controlled machine tool said process performing the check of the dynamic behavior of the axes controlled by the heads and/or the movements of these axes combined with the movements of the linear axis, the analysis of the response curve of the axes compared with the programmed one allowing to analyze problems like twitching and ripple, said process operating at the presence of a pass-band of at least 1 kHz of the signal sampled by the system.

7. A process for compensating numerically controlled machine tool heads and/or tables using a system for measuring, compensating and testing numerically controlled machine tool heads and/or tables, characterized in that it comprises: at least one support base equipped with a plurality of distance sensors; and at least one device of the gage tool type composed of an elongated cylinder, said cylinder being equipped at one of its ends with connection means for said heads and being equipped at another opposite end with a ball, said ball being placed next to said sensors so that they are able, always and in any position, to measure a distance that separates them from said ball; wherein the system is operatively coupled with processing means, said processing means being adapted through a single measure obtained by said sensors about a distance that separates said sensors from said ball, to detect the XYZ coordinates of a center of a tool in a position of interest; and wherein said processing means comprise means for performing measure processes for errors that can be modeled, means for performing measure processes for errors that cannot be modeled and means for performing dynamic checks, said process being divided into a part that performs the compensation of head movements using a geometric model and a part that performs the compensation of non-geometric errors or errors that cannot be modeled.

8. A process using a system for measuring, compensating and testing numerically controlled machine tool heads and/or tables, characterized in that it comprises: at least one support base equipped with a plurality of distance sensors; and at least one device of the gage tool type composed of an elongated cylinder, said cylinder being equipped at one of its ends with connection means for said heads and being equipped at another opposite end with a ball, said ball being placed next to said sensors so that they are able, always and in any position, to measure a distance that separates them from said ball; wherein the system is operatively coupled with processing means, said processing means being adapted through a single measure obtained by said sensors about a distance that separates said sensors from said ball, to detect the XYZ coordinates of a center of a tool in a position of interest; and wherein said processing means comprise means for performing measure processes for errors that can be modeled, means for performing measure processes for errors that cannot be modeled and means for performing dynamic checks, for measuring a position of a center of a ball connected to axes of a machine tool, using a cylinder with a ball connected to the machine tool and three distance sensors in contact with the ball, said process comprising the steps of:

defining a fixed position (1) of the ball in the inertial system XYZ ("centered ball position");
    moving the machine/head to the position (1);
    driving again the ball in its centered ball position;
    recording a position (2) of the machine axes XYZ (X1, Y1, Z1);
    moving the machine/head to position (2);
    driving again the ball in its centered ball position; and
    recording a position of the machine axes XYZ (X2, Y2, Z2); and
    wherein the differences X1–X2, Y1–Y2, Z1–Z2 are the errors made by the CNC system in carrying out its movements from position (1) to position (2).

9. A process using a system for measuring, compensating and testing numerically controlled machine tool heads and/or tables, characterized in that it comprises: at least one support base equipped with a plurality of distance sensors; and at least one device of the gage tool type composed of an elongated cylinder, said cylinder being equipped at one of its ends with connection means for said heads and being equipped at another opposite end with a ball, said ball being placed next to said sensors so that they are able, always and in any position, to measure a distance that separates them from said ball; wherein the system is operatively coupled with processing means, said processing means being adapted through a single measure obtained by said sensors about a distance that separates said sensors from said ball, to detect the XYZ coordinates of a center of a tool in a position of interest; and wherein said processing means comprise means for performing measure processes for errors that can be modeled, means for performing measure processes for errors that cannot be modeled and means for performing dynamic checks, for determining errors indexes regarding rectilineity, scale and orthogonality for linear axes XYZ of a machine tool starting from measures performed with a single test cylinder with ball end, said process being able to measure a same error in different positions/shapes of a measuring head, said process distinguishing which are the errors that can be associated with movements of rotating head axes with respect to movements performed by linear axes, said linear axes being also moved, following the movements of the rotating axes, in order to keep a tip of a possible tool unmoving.

10. A process using a system for measuring, compensating and testing numerically controlled machine tool heads and/or tables, characterized in that it comprises: at least one support base equipped with a plurality of distance sensors; and at least one device of the gage tool type composed of an elongated cylinder, said cylinder being equipped at one of its ends with connection means for said heads and being equipped at another opposite end with a ball, said ball being placed next to said sensors so that they are able, always and in any position, to measure a distance that separates them from said ball; wherein the system is operatively coupled with processing means, said processing means being adapted through a single measure obtained by said sensors about a distance that separates said sensors from said ball, to detect the XYZ coordinates of a center of a tool in a position of interest; and wherein said processing means comprise means for performing measure processes for errors that can be modeled, means for performing measure processes for errors that cannot be modeled and means for performing dynamic checks, for measuring a position of a center of a ball connected to axes of a machine tool, using a cylinder with a ball connected to the machine tool and three distance sensors in contact with the ball, said process comprising the steps of:

defining a fixed position (1) of the ball in the inertial system XYZ ("centered ball position");
    moving the machine/head to the position (1);
    driving again the ball in its centered ball position;
    recording a position (2) of the machine axes XYZ (X1, Y1, Z1);
    moving the machine/head to position (2);
    driving again the ball in its centered ball position; and
    recording a position of the machine axes XYZ (X2, Y2, Z2); and
    wherein the differences X1–X2, Y1–Y2, Z1–Z2 are the errors made by the CNC system in carrying out its movements from position (1) to position (2).

11. A process using a system for measuring, compensating and testing numerically controlled machine tool heads and/or tables, characterized in that it comprises: at least one support base equipped with a plurality of distance sensors; and at least one device of the gage tool type composed of an elongated cylinder, said cylinder being equipped at one of its ends with connection means for said heads and being equipped at another opposite end with a ball, said ball being placed next to said sensors so that they are able, always and in any position, to measure a distance that separates them from said ball; wherein the system is operatively coupled with processing means, said processing means being adapted through a single measure obtained by said sensors about a distance that separates said sensors from said ball, to detect the XYZ coordinates of a center of a tool in a position of interest; and wherein said processing means comprise means for performing measure processes for errors that can be modeled, means for performing measure processes for errors that cannot be modeled and means for performing dynamic checks, for determining errors indexes regarding rectilineity, scale and orthogonality for linear axes XYZ of a machine tool starting from measures performed with a single rest cylinder with ball end, said process being able to measure a same error in different positions/shapes of a measuring head, said process distinguishing which are the errors that can be associated with movements of rotating head axes with respect to movements performed by linear axes, said linear axes being also moved following the movements of the rotating axes, in order to keep a tip of a possible tool unmoving.

12. A process for measuring numerically controlled machine tool heads and/or tables using a system for measuring, compensating and testing numerically controlled machine tool heads and/or tables, characterized in that it comprises: at least one support base equipped with a plurality of distance sensors; and at least one device of the gage tool type composed of an elongated cylinder, said cylinder being equipped at one of its ends with connection means for said heads and being equipped at another opposite end with a ball, said ball being placed next to said sensors so that they are able, always and in any position, to measure a distance that separates them from said ball; wherein the system is operatively coupled with processing means, said processing means being adapted through a single measure obtained by said sensors about a distance that separates said sensors from said ball, to detect the XYZ coordinates of a center of a tool in a position of interest; and wherein said processing means comprise means for performing measure processes for errors that can be modeled, means for performing measure processes for errors that cannot be modeled and means for performing dynamic checks said process comprising the steps of:

performing a plurality of automatic measures adapted to determine the parameters of a geometric model of the head, said geometric model being the mathematical model that describes the real head behavior with respect to the theoretical behavior, the parameters of said model being obtained through the measures and being called errors that can be modeled, said geometric model being of a complexity that can be freely defined by a user due to an integration of said system with numeric control means (CNC), to a measuring accuracy provided by an absence of collisions among moving parts and to a quick acquisition of error measures;

computing the detected errors that can be modeled;

compensating the computed errors that can be modeled through said numeric control means (CNC) for working purposes through an integrated system; and detecting and measuring errors not described by the model being used, said errors being called errors not able to be modeled and generating a still incorrect positioning of the head.

13. The process according to claim 12, characterized in that the error detecting steps are realized through said support base with the sensors that provides the position of the ball of the gage tool.

14. The process according to claim 13, characterized in that the measure of the positioning errors of the ball of the gage tool is carried out through the head movement using compensations related to errors that can be modeled, the numeric control means deeming to have kept the center of the ball unmoved, the difference between theoretical coordinates and real coordinates of the ball (20) being the measured errors.

15. The process according to claim 13, characterized in that the measure of the positioning errors of the ball of the gage tool is carried out by using the values provided by the sensors of the support base that are transformed into the real coordinates of the ball of the gage tool, the difference between theoretical coordinates and real coordinates of the ball being the measured errors.

16. The process according to claim 13, characterized in that the measure of the positioning errors of the ball of the gage tool is carried out by using, as an alternative, the values provided by the sensors of the support base that are used to correct the machine linear axis position in order to take back the ball to the point where the sensors provide the initial values, the ball being not moving and the linear axis performing an additional movement with respect to the one that the numeric control means (CNC) would have imposed thereto depending on currently active compensations, said correction being the measured errors.

17. The process according to claim 16, characterized in that it further comprises a calibrating step of the sensors of the support base.

18. The process according to claim 12, characterized in that it is also adapted to perform an automatic measure of the angular positioning accuracy of the rotation axes and the parallelism of the rotation axes with linear axis through computing techniques used in the field of measuring and inspecting the geometric models, said techniques referring to the reconstruction of curves and/or surfaces through a series of points.

19. The process according to claim 18, wherein, for a head, there are planes in which the circumference described by the tool tip lies when the following movements are realized;

axis B at 90°; axis A that performs one revolution (circle 1), axis A at 0°; axis B that performs one revolution (circle 2), said planes being perpendicular and parallel to machine tool Cartesian axes; characterized in that such process comprises the steps of:

executing the circle 1;

rebuilding with moan square methods or the like said circle 1 through a series of points describing it;

locating the non-parallelism of the plane passing through said circle 1 with respect to the plane that is orthogonal to the ideal rotation axis of axis A:

locating the relationship between position transduced by axis A measuring systems and related tool tip location point and then computing the angular positioning accuracy of axis A;

executing the circle 2;

rebuilding with means square methods or the like said circle 2 through a series of points describing it;

locating the non-parallelism of the plane passing through said circle 2 with respect to the plane that is orthogonal to the ideal rotation axis for axis B;

locating the axis A position 0 through the component of the previously described angles that lies in the plane perpendicular to the ideal rotation axis of axis A;

locating the axis B position 0 through the, measured point on circle 2 that allows having the tool as vertical; and locating the relationship between position transduced by axis B measuring systems and related tool tip positioning point and then computing the angular positioning accuracy of axis B.

20. The process according to claim 12, characterized in that it automatically performs the head positioning error measures in order to obtain a number of independent algebraic equations that allow solving the parameters of the geometric model of the head.

21. The process according to claim 12, characterized in that the measures are performed by selecting a number of measures independent from the search of the model parameter resolution, extending the applicability of the process to every kind of configuration of head and/or head with table, the model arriving to such complexities as to also take into account possible positioning errors of the ball of the gage tool deriving from movement errors of linear axis, namely the axis moving the head.

22. The process according to claim 12, characterized in that, if the error compensation performed by the numeric control means (CNC) has not the same degree of complexity of the measures, the system performs the translation of the parameters of its own model into the parameters of the compensation model.

23. The process according to claim 12, characterized in that the step of measuring the errors that cannot be modeled comprises the sub-steps of:
  establishing only an empirical link with the position of the axis of the head, for which the relationship will be univocal;
  performing two measures for every head position through two gage tools with a known and different length;
  being, for a generic length of a head tool, the error a linear interpolation of the pair of three measured values DX, DY and DZ, measuring the errors DX, DY and DZ of the ball of the gage tool for all affected positions, said measures being performed first with a gage tool and then with a following gage tool; and
  discretizing the position combinations of the two axes from their negative end to their positive end in order to obtain the affected positions, said discretizing being performed with an empirically established step or with error frequency analysis algorithms.

24. A system for measuring, compensating and testing numerically controlled machine tool heads and/or tables, characterized in that it comprises:
  at least one support base equipped with a plurality of distance sensors; and
  at least one device of the gage tool type composed of an elongated cylinder, said cylinder being equipped at one of its ends with connection means for said heads and being equipped at another opposite end with a ball, said ball being placed next to said sensors so that they are able, always and in any position, to measure a distance that separates them from said ball; and
  wherein said support base is connected to bearing means adapted to allow a rotation of said support base up to 90° with respect to its own axis, in order to reach a plurality of operating positions between two mutually perpendicular extreme axes, said bearing means being further adapted to simultaneously allow a rotation of said support base, once having reached the extreme axis position, around the axis perpendicular thereto.

25. The system according to claim 24, characterized in that said support base is of a circular shape and is equipped with three distance sensors placed on the base in positions that are mutually offset by 120°.

26. The system according to claim 24, characterized in that said connection means are of a tapered shape and said heads are adapted to receive, In one of their moving parts, said connection means for the unmovable connection thereto during the measures.

27. The system according to claim 24, characterized in that it is operatively coupled with processing means, said processing means being adapted, through a single measure obtained by said sensors about a distance that separates said sensors from said ball, to detect the XYZ coordinates of a center of a tool in a position of interest.

28. The system according to claim 27, characterized in that said processing means comprise means for performing measure processes for errors that can be modeled, means for performing measure processes for errors that cannot be modeled and means for performing dynamic checks.

29. The system according to claim 24, characterized in that said heads are operatively coupled and integrated with CNC test and control means also comprising means for performing compensation processes for errors that can be modeled and means for performing compensation processes for errors that cannot be modeled.

30. A process for measuring numerically controlled machine tool heads and/or tables using a system for measuring, compensating and testing numerically controlled machine tool heads and/or tables, characterized in that it comprises: at least one support base equipped with a plurality of distance sensors; and at least one device of the gage tool type composed of an elongated cylinder, said cylinder being equipped at one of its ends with connection means for said heads and being equipped at another opposite end with a ball, said ball being placed next to said sensors so that they are able, always and in any position, to measure a distance that separates them from said ball; wherein said support base is connected to bearing means adapted to allow a rotation of said support base up to 90° with respect to its own axis, in order to reach a plurality of operating positions between two mutually perpendicular extreme axes, said bearing means being further adapted to simultaneously allow a rotation of said support base, once having reached the extreme axis position, around the axis perpendicular thereto said process comprising the steps of:
  performing a plurality of automatic measures adapted to determine the parameters of a geometric model of the head, said geometric model being the mathematical model that describes the real head behavior with respect to the theoretical behavior, the parameters of said model being obtained through the measures and being called errors that can be modeled, said geometric model being of a complexity that can be freely defined by a user due to an integration of said system with numeric control means (CNC), to a measuring accuracy provided by the system to an absence of collisions among moving parts and a system for measuring, compensating and testing numerically controlled machine tool heads and/or tables, characterized in that it comprises: at least one support base equipped with a plurality of distance sensors; and at least one device of the gage tool type composed of an elongated cylinder, said cylinder being equipped at one of its ends with connection means for said heads and being equipped at another opposite end with a ball, said ball being placed next to said sensors so that they are able, always and in any position, to measure a distance that separates them from said ball; wherein the system is operatively coupled with processing means, said processing means being adapted through a single measure obtained by said sensors about a distance that separates said sensors from said ball, to detect the XYZ coordinates of a center of a tool in a position of interest; and wherein said processing means comprise means for performing measure processes for errors that can be modeled, means for performing measure processes for errors that cannot be modeled and means for performing dynamic checks, and to a quick acquisition of error measures;

computing the detected errors that can be modeled;

compensating the computed errors that can be modeled through said numeric control means (CNC) for working purposes through an integrated system; and detecting and measuring errors not described by the model being used, said errors being called errors not able to be modeled and generating a still incorrect positioning of the head.

31. The process according to claim 30, characterized in that the error detecting steps are realized through said support base with the sensors that provides the position of the ball of the gage tool.

32. The process according to claim 31, characterized in that the measure of the positioning errors of the ball of the gage tool is carried out through the head movement using compensations related to errors that can be modeled, the numeric control means deeming to have kept the center of the ball unmoved, the difference between theoretical coordinates and real coordinates of the ball being the measured errors.

33. The process according to claim 31, characterized in that the measure of the positioning errors of the ball of the gage tool is carried out by using the values provided by the sensors of the support base that are transformed into the real coordinates of the ball of the gage tool, the difference between theoretical coordinates and real coordinates of the ball being the measured errors.

34. The process according to claim 31, characterized in that the measure of the positioning errors of the ball of the gage tool is carried out by using, as an alternative, the values provided by the sensors of the support base that are used to correct the machine linear axis position in order to take back the ball to the point where the sensors provide the initial values, the ball being not moving and the linear axis performing an additional movement with respect to the one that the numeric control means (CNC) would have imposed thereto depending on currently active compensations, said correction being the measured errors.

35. The process according to claim 34, characterized in that it further comprises a calibrating step of the sensors of the support base.

36. The process according to claim 30, characterized in that it is also adapted to perform an automatic measure of the angular positioning accuracy of the rotation axes and the parallelism of the rotation axes with linear axis through computing techniques used in the field of measuring and inspecting the geometric models, said techniques referring to the reconstruction of curves and/or surfaces through a series of points.

37. The process according to claim 36, wherein, for a head, there are planes in which the circumference described by the tool tip lies when the following movements are realized:

axis B at 90°; axis A that performs one revolution (circle 1).

axis A at 0°; axis B that performs one revolution (circle 2), said planes being perpendicular and parallel to machine tool Cartesian axes; characterized in that such process comprises the steps of:

executing the circle 1;

rebuilding with mean square methods or the like said circle 1 through a series of points describing it;

locating the non-parallelism of the plane passing through said circle 1 with respect to the plane that is orthogonal to the ideal rotation axis of axis A;

locating the relationship between position transduced by axis A measuring systems and related tool tip location point and then computing the angular positioning accuracy of axis A;

executing the circle 2;

rebuilding with means square methods or the like said circle 2 through a series of points describing it;

locating the non-parallelism of the plane passing through said circle 2 with respect to the plane that is orthogonal to the ideal rotation axis for axis B;

locating the axis A position 0 through the component of the previously described angles that lies in the plane perpendicular to the ideal rotation axis of axis A;

locating the axis B position 0 through the measured point on circle 2 that allows having the tool as vertical; and locating the relationship between position transduced by axis B measuring systems and related tool tip positioning point and then computing the angular positioning accuracy of axis B.

38. The process according to claim 30, characterized in that it automatically performs the head positioning error measures in order to obtain a number of independent algebraic equations that allow solving the parameters of the geometric model of the head.

39. The process according to claim 30, characterized in that the measures are performed by selecting a number of measures independent from the search of the model parameter resolution, extending the applicability of the process to every kind of configuration of head and/or head with table, the model arriving to such complexities as to also take into account possible positioning errors of the ball of the gage tool deriving from movement errors of linear axis, namely the axis moving the head.

40. The process according to claim 30, characterized in that, if the error compensation performed by the numeric control means (CNC) has not the same degree of complexity of the measures, the system performs the translation of the parameters of its own model into the parameters of the compensation model.

41. The process according to claim 30, characterized in that the step of measuring the errors that cannot be modeled comprises the sub-steps of:

establishing only an empirical link with the position of the axis of the head, for which the relationship will be univocal;

performing two measures for every head position through two gage tools with a known and different length;

being, for a generic length of a head tool, the error a linear interpolation of the pair of three measured values DX, DY and DZ, measuring the errors DX, DY and DZ of the ball of the gage tool for all affected positions, said measures being performed first with a gage tool and then with a following gage tool; and discretizing the position combinations of the two axes from their negative end to their positive end in order to obtain the affected positions, said discretizing being performed with an empirically established step or with error frequently analysis algorithms.

42. A process for compensating numerically controlled machine tool heads and/or tables using a system for measuring, compensating and testing numerically controlled machine tool heads and/or tables, characterized in that it comprises: at least one support base equipped with a plurality of distance sensors; and at least one device of the gage tool type composed of an elongated cylinder, said cylinder being equipped at one of its ends with connection means for said heads and being equipped at another opposite end with a ball, said ball being placed next to said sensors so that they are able, always and in any position, to measure a distance that separates them from said ball; wherein said support base is connected to bearing means adapted to allow a rotation of said support base up to 90° with respect to its own axis, in order to reach a plurality of operating positions between two mutually perpendicular extreme axes, said bearing means being further adapted to simultaneously allow a rotation of said support base, once having reached the extreme axis position, around the axis perpendicular thereto said process being divided into a part that performs the compensation of head movements using a geometric model and a part that performs the compensation of non-geometric errors or errors that cannot be modeled.

43. A process for resting numerically controlled machine tool heads and/or tables using a system for measuring, compensating and testing numerically controlled machine tool heads and/or tables, characterized in that it comprises: at least one support base equipped with a plurality of distance sensors; and at least one device of the gage tool type composed of an elongated cylinder, said cylinder being equipped at one of its ends with connection means for said heads and being equipped at another opposite end with a ball, said ball being placed next to said sensors so that they are able, always and in any position, to measure a distance that separates them from said ball; wherein said support base is connected to bearing means adapted to allow a rotation of said support base up to 90° with respect to its own axis, in order to reach a plurality of operating positions between two mutually perpendicular extreme axes, said bearing means being further adapted to simultaneously allow a rotation of said support base, once having reached the extreme axis position, around the axis perpendicular thereto said process performing the check of the dynamic behavior of the axes controlled by the heads and/or the movements of these axes combined with the movements of the linear axis, the analysis of the response curve of the axes compared with the programmed one allowing to analyze problems like twitching and ripple, said process operating at the presence of a pass-band of at least 1 kHz of the signal sampled by a system for measuring, compensating and testing numerically controlled machine tool heads and/or tables, characterized in that it comprises: at least one support base equipped with a plurality of distance sensors; and at least one device of the gage tool type composed of an elongated cylinder, said cylinder being equipped at one of its ends with connection means for said heads and being equipped at another opposite end with a ball, said ball being placed next to said sensors so that they are able, always and in any position, to measure a distance that separates them from said ball; wherein the system is operatively coupled with processing means, said processing means being adapted through a single measure obtained by said sensors about a distance that separates said sensors from said ball, to detect the XYZ coordinates of a center of a tool in a position of interest; and wherein said processing means comprise means for performing measure processes for errors that can be modeled, means for performing measure processes for errors that cannot be modeled and means for performing dynamic checks.

* * * * *

UNITED STATES PATENT AND TRADEMARK OFFICE
CERTIFICATE OF CORRECTION

PATENT NO. : 7,245,982 B2
APPLICATION NO. : 10/525927
DATED : July 17, 2007
INVENTOR(S) : Giuseppe Morfino It is certified that error appears in the above-identified patent and that said Letters Patent is hereby corrected as shown below:

Column 25, line 62: change "canceled" to --coupled--

Column 29, line 9: change "rest" to --test--

Column 30, line 44: change "moan" to --mean--

Column 32, line 1: change "In" to --in--

Column 34, line 64: change "frequently" to --frequency--

Column 35, line 21: change "resting" to --testing--

Signed and Sealed this

Eighteenth Day of September, 2007

JON W. DUDAS
*Director of the United States Patent and Trademark Office*